United States Patent
Hricik et al.

(10) Patent No.: US 12,535,518 B2
(45) Date of Patent: Jan. 27, 2026

(54) MULTIPLE TRANSPORT LEVEL TESTER SYSTEM

(71) Applicant: Wolfspeed, Inc., Durham, NC (US)

(72) Inventors: Jason P. Hricik, Springdale, AR (US); Timothy Foster, Fayetteville, AR (US); Jacob Kobliska, Farmington, AR (US); Michael Scott, Fayetteville, AR (US)

(73) Assignee: Wolfspeed, Inc., Durham, NC (US)

( * ) Notice: Subject to any disclaimer, the term of this patent is extended or adjusted under 35 U.S.C. 154(b) by 406 days.

(21) Appl. No.: 18/077,869

(22) Filed: Dec. 8, 2022

(65) Prior Publication Data
US 2024/0192261 A1   Jun. 13, 2024

(51) Int. Cl.
| | |
|---|---|
| G01R 31/26 | (2020.01) |
| G01R 1/02 | (2006.01) |
| G01R 1/04 | (2006.01) |
| G01R 1/067 | (2006.01) |
| G01R 1/073 | (2006.01) |
| G01R 31/02 | (2006.01) |
| G01R 31/28 | (2006.01) |

(52) U.S. Cl.
CPC ................ *G01R 31/2642* (2013.01)

(58) Field of Classification Search
CPC ........ G01R 31/01; G01R 31/02; G01R 31/26; G01R 31/2642; G01R 31/28; G01R 1/02; G01R 1/04; G01R 1/067; G01R 1/073
See application file for complete search history.

(56) References Cited

U.S. PATENT DOCUMENTS

| | | | |
|---|---|---|---|
| 4,725,182 A | 2/1988 | Sakamoto et al. | |
| 6,156,078 A * | 12/2000 | Huat | G01R 31/01 29/25.01 |
| 6,504,395 B1 | 1/2003 | Johnson | |
| 2005/0162151 A1 | 7/2005 | Tsui et al. | |
| 2010/0218050 A1 | 8/2010 | Co et al. | |
| 2013/0207679 A1 | 8/2013 | Cheng et al. | |
| 2015/0276852 A1* | 10/2015 | Kikuchi | G01R 31/2893 324/750.25 |
| 2019/0064261 A1 | 2/2019 | Bowyer et al. | |
| 2022/0026487 A1* | 1/2022 | Arai | G01R 31/2874 |

FOREIGN PATENT DOCUMENTS

| | | |
|---|---|---|
| CN | 106076886 A | 11/2016 |
| CN | 106249134 A | 12/2016 |

OTHER PUBLICATIONS

Taiwanese Office Action for Taiwanese Patent Application No. 112147638, dated Jul. 29, 2024, 9 pages (including English translation of Search Report).
International Search Report and Written Opinion of the International Searching Authority for PCT International Application No. PCT/US2023/082628 mailed Apr. 23, 2024, 13 pages.

* cited by examiner

*Primary Examiner* — Neel D Shah
(74) *Attorney, Agent, or Firm* — Sage Patent Group

(57) ABSTRACT

A multiple transport level tester system according to some embodiments includes an entry point, an exit point, a first transport level having a first level, and at least one additional transport levels, wherein the first level is different than the at least one additional levels. The multiple transport level tester system further includes at least one environmental conditioning chamber configured to perform an environmental conditioning on units under test; and at least one test station configured to perform at least one test on the units under test.

32 Claims, 16 Drawing Sheets

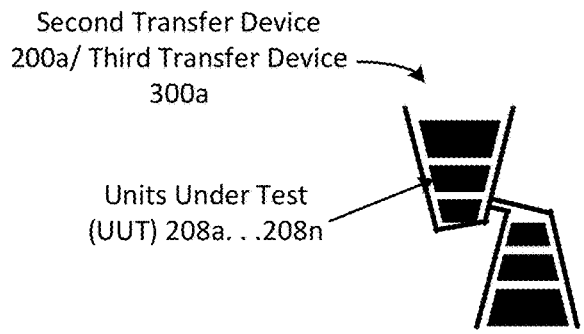
Figure 4A
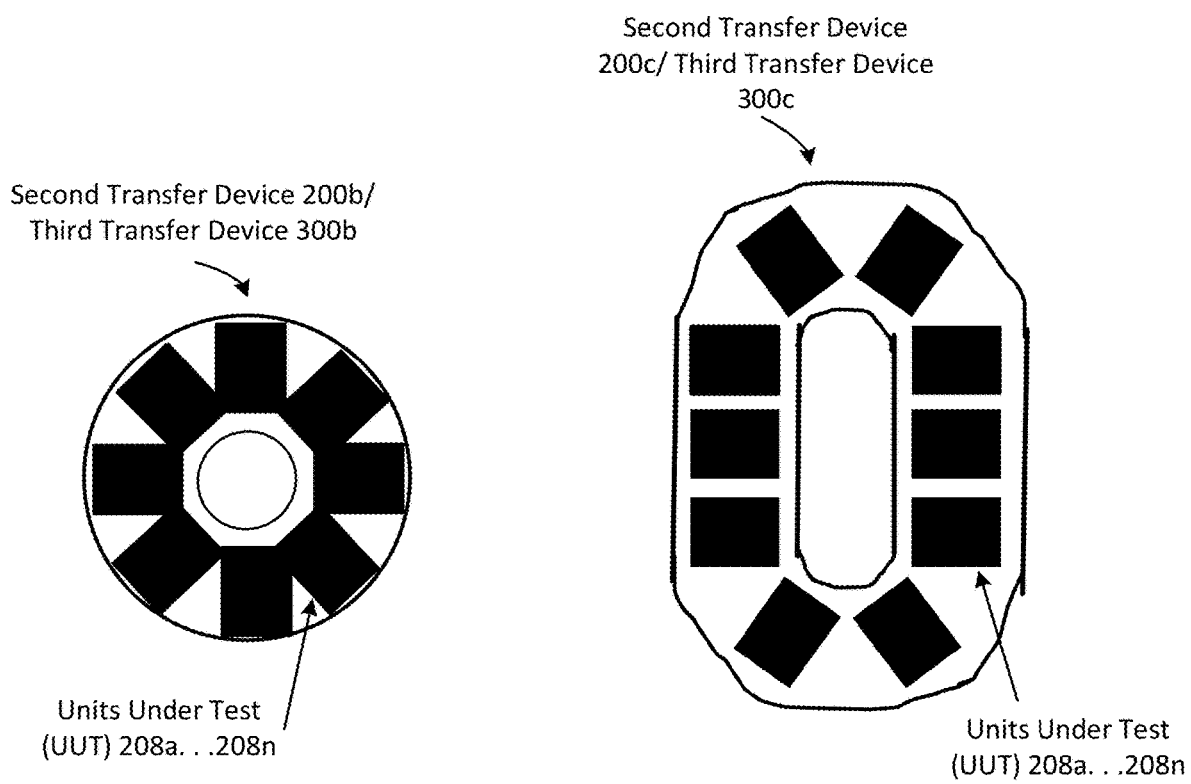
Figure 4B  Figure 4C

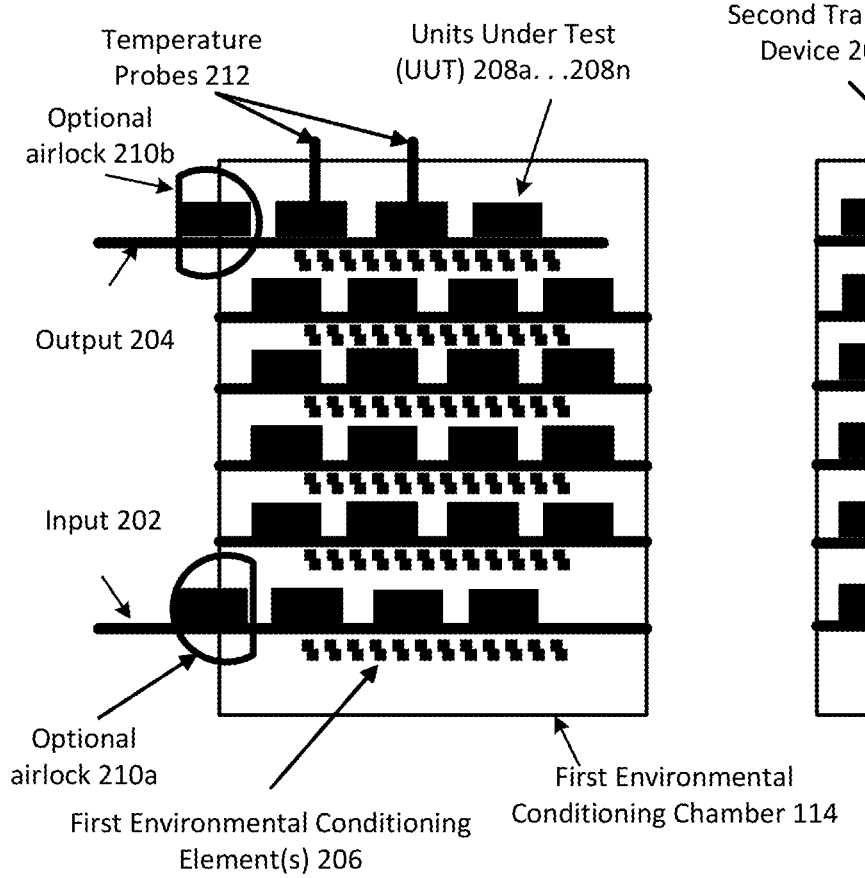
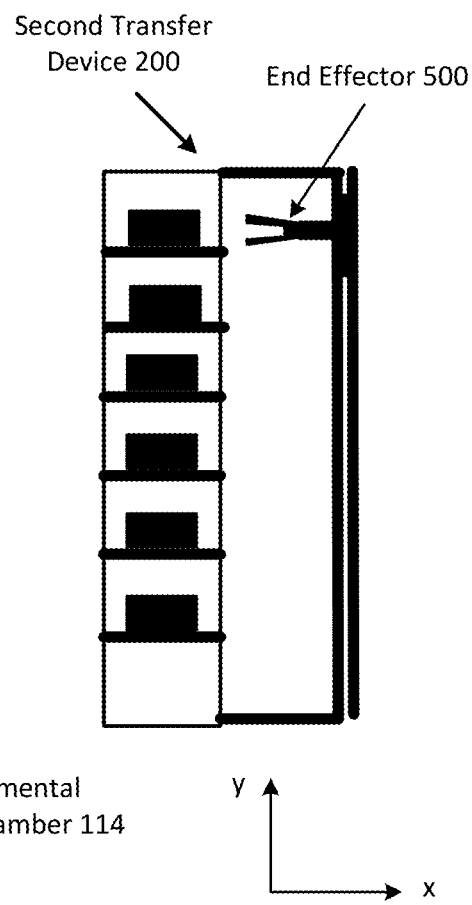
Figure 5A     Figure 5B
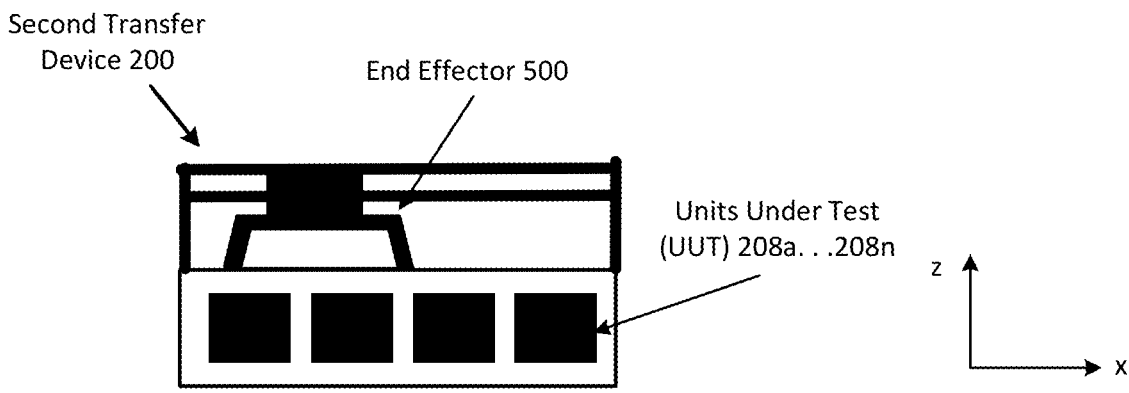
Figure 5C

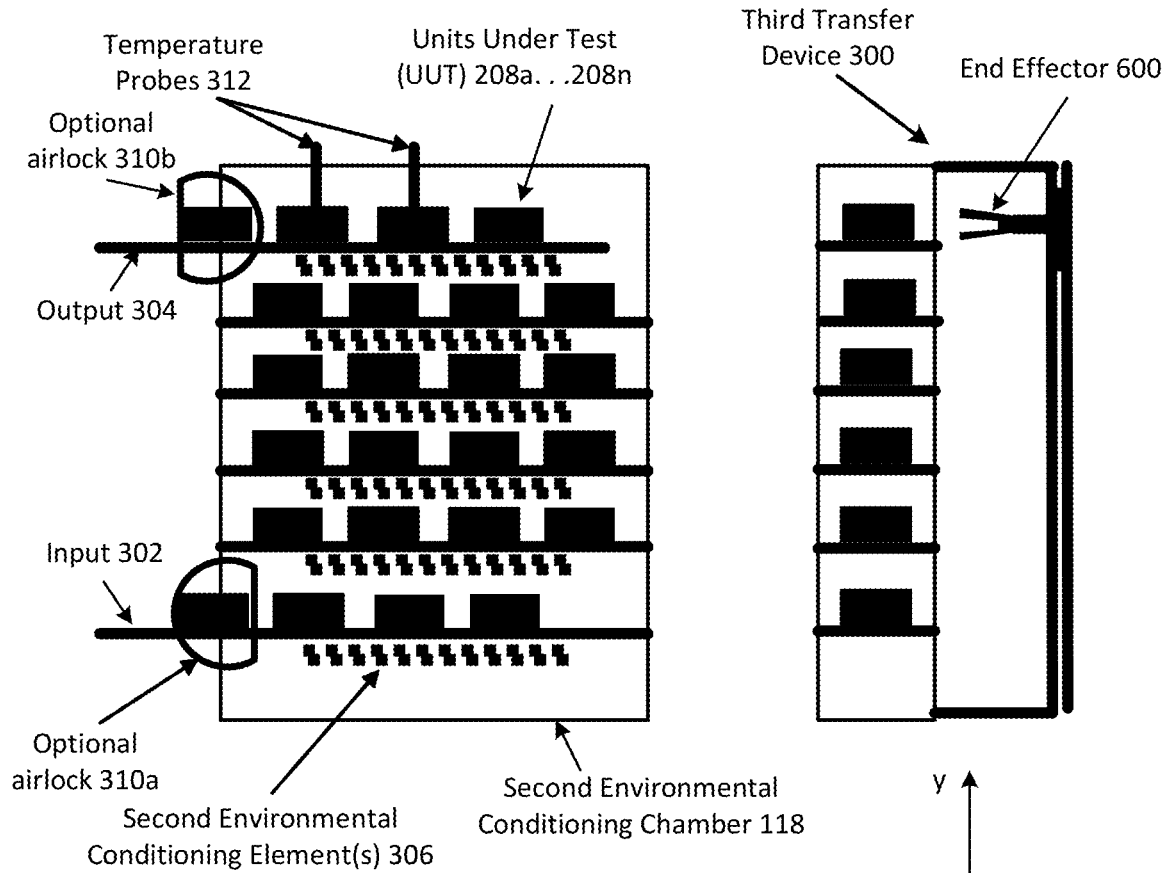
Figure 6A
Figure 6B
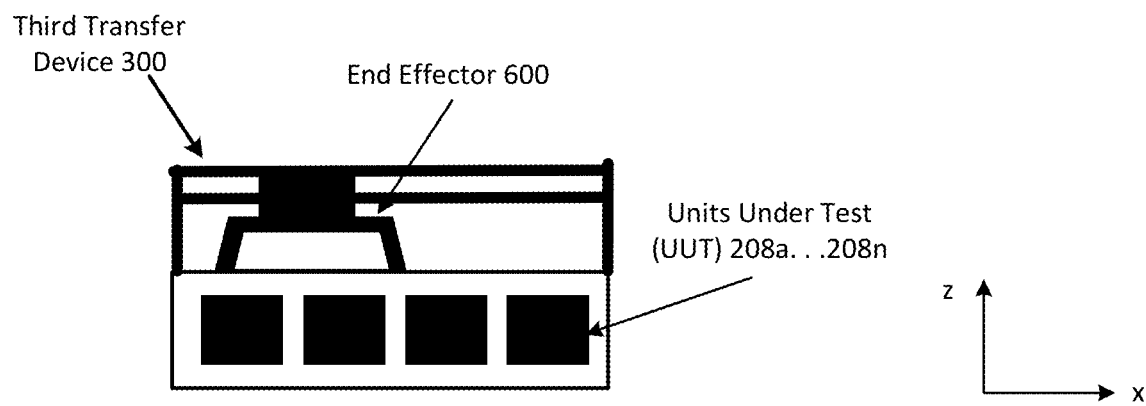
Figure 6C

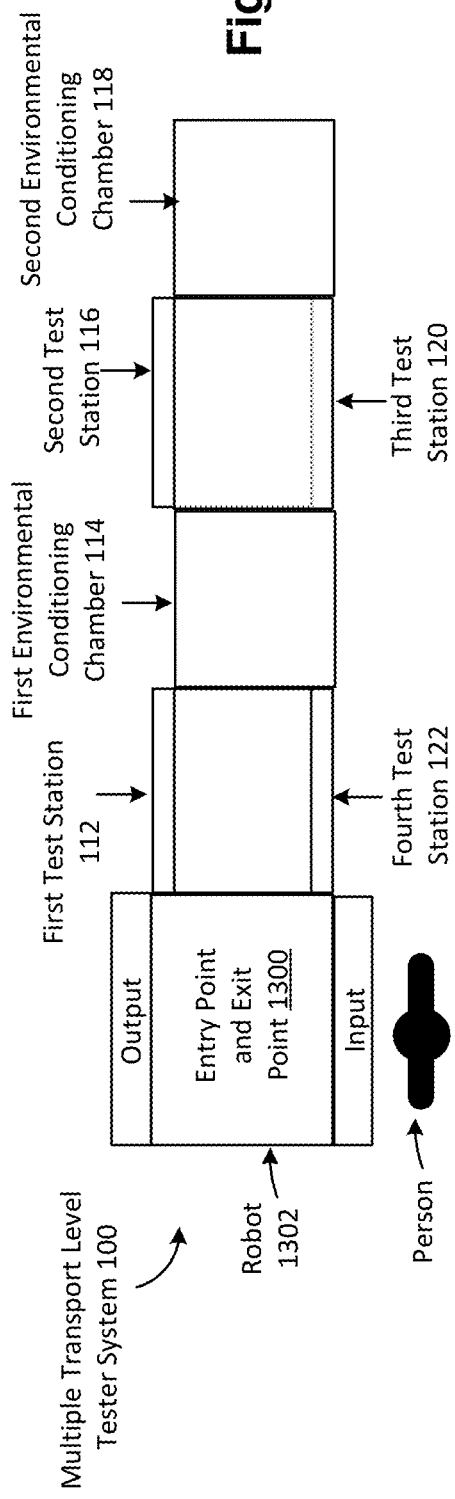
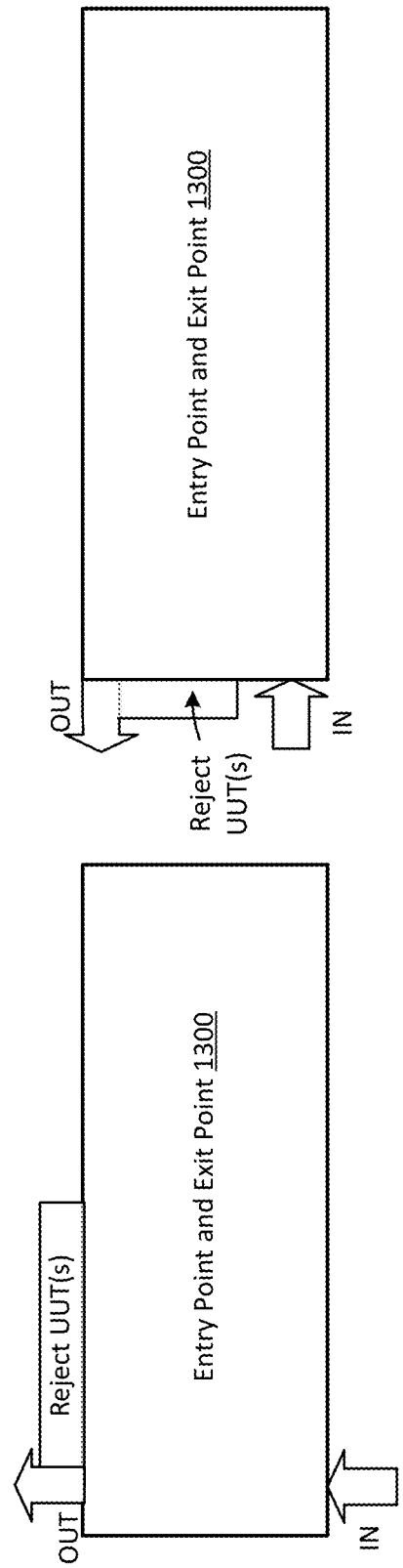

MULTIPLE TRANSPORT LEVEL TESTER SYSTEM

FIELD

The disclosure relates to multiple transport level tester systems. More particularly, an example embodiment of the present disclosure relates to a multiple transport level tester system configured to test units under test (UUTs) such as, for example, semiconductor based power modules.

BACKGROUND

Tester systems include components for performing various tests on UUTs. For example, testing is performed on semiconductor based power modules to confirm that the power modules function properly after manufacturing and production processes.

Components included in tester systems can include a number of test stations and other components to perform tests under different conditions in order to determine whether performance of respective UUTs under the test conditions are acceptable or rejected. The components of the test system can be configured in a linear dimension in a single level parallel to a floor of a manufacturing facility, for example. Consequently, the floor space taken by such tester systems is typically the same, or larger than, the sum of the area of the components and the interconnections between the components of the tester system.

SUMMARY

A multiple transport level tester system according to some embodiments includes an entry point, an exit point, a first transport level having a first level, and a second transport level having a second level, wherein the first level is different than the second level. The multiple transport level tester system further includes a first environmental conditioning chamber configured to perform a first environmental conditioning on a UUT; a second environmental conditioning chamber configured to perform a second environmental conditioning on the UUT; and a first test station configured to perform a first test on the UUT.

The entry point may be adjacent to the exit point. The multiple transport level tester system may further include a first end of the multiple transport level tester system; and a second end of the multiple transport level tester system; a first side of the multiple transport level tester system; and a second side of the multiple transport level tester system. The multiple transport level tester is configured between the first end and the second end and between the first side and the second side.

The entry point and the exit point may be configured at one or more of the first end, the second end, the first side, and the second side, and at least one of the first end and the second end of the multiple transport level tester system.

The first level and second levels, respectively, may be substantially level between the first and second ends of the multiple transport level tester system.

The first level may have a variable level within the first transport level.

The second level may have a variable level within the second transport level.

The entry point may be configured to receive the UUT and include a first transfer device configured to handle one or more tiers.

The entry point may be configured to receive the UUT in the second transport level and the first transfer device may be configured to move the UUT between the one or more tiers within the second transport level.

The entry point may be configured to receive the UUT in the first transport level and the first transfer device may be configured to move the UUT between the one or more tiers within the first transport level.

The first transfer device may include a shelf system having the one or more tiers for at least one shelf and an end-effector configured to move a UUT from the at least one shelf towards the first test station.

The first test station may be configured to receive and to output the UUT in the second transport level.

The first test station may be configured to receive and to output the UUT in the first transport level.

The first environmental conditioning chamber may be configured to receive and to output the UUT in the second transport level.

The first environmental conditioning chamber may be configured to receive the UUT in the second transport level and to output the UUT in the first transport level.

The first environmental conditioning chamber may be configured to receive the UUT in the first transport level and to output the UUT in the second transport level.

The first environmental conditioning chamber may be configured to receive the UUT and may include a second transfer device having one or more tiers, the second transfer device may be configured to move the UUT between the one or more tiers.

The first environmental conditioning chamber may be configured to receive the UUT in the second transport level and the second transfer device may be configured to output the UUT in the second transport level.

The first environmental conditioning chamber may be configured to receive the UUT in the second transport level and the second transfer device may be configured to output the UUT in the first transport level.

The first environmental conditioning chamber may be configured to receive the UUT in the first transport level and the second transfer device may be configured to output the UUT in the second transport level, The second transfer device may include at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the first environmental conditioning chamber.

The first environmental conditioning chamber may include an environmental controller configured to control at least one of (i) a temperature, (ii) an atmospheric condition, (iii) a humidity, (iv) electromagnetic radiation, and (v) a pressure.

The second environmental conditioning chamber may be configured to receive the UUT in the second transport level and to output the UUT in the first transport level.

The second environmental conditioning chamber may be configured to receive the UUT in the first transport level and to output the UUT in the second transport level.

The multiple transport level tester system may further include a third transport level having a third level, and the second environmental conditioning chamber may be configured to receive the UUT in the second transport level and to output the UUT in the third transport level.

The second environmental conditioning chamber may be configured to receive the UUT and may include a third transfer device having one or more tiers. The third transfer device may be configured to move the UUT between the one or more tiers.

The second environmental conditioning chamber may be configured to receive the UUT in the second transport level and the third transfer device may be configured to output the UUT in the first transport level.

The second environmental conditioning chamber may be configured to receive the UUT in the first transport level and the third transfer device may be configured to output the UUT in the second transport level.

The multiple transport level tester system may further include a third transport level having a third level, and the second environmental conditioning chamber may be configured to receive the UUT in the second transport level and the third transfer device may be configured to output the UUT in the third transport level.

The third transfer device may include at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the second environmental conditioning chamber in the first transport level.

The third transfer device may include at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the second environmental conditioning chamber in the second transport level.

The third transfer device may include at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the second environmental conditioning chamber in the third transport level.

The second environmental conditioning chamber may include an environmental controller configured to control at least one of (i) a temperature, (ii) an atmospheric condition, (iii) a humidity, (iv) electromagnetic radiation, and (v) a pressure.

The multiple transport level tester system may further include a second test station that may be configured to receive and to output the UUT in the second transport level.

The multiple transport level tester system may further include a second test station that may be configured to receive and to output the UUT in the first transport level.

The multiple transport level tester system may further include a third test station that may be configured to receive and to output the UUT in the first transport level.

The multiple transport level tester system may further include a third test station that may be configured to receive and to output the UUT in the second transport level.

The multiple transport level tester system may further include a fourth test station that may be configured to receive and to output the UUT in the first transport level.

The multiple transport level tester system may further include a fourth test station that may be configured to receive and to output the UUT in the second transport level.

The multiple transport level tester system may further include a third transport level having a third level; and a third test station that may be configured to receive the UUT in the second transport level and to output the UUT to the third transport level.

The exit point may be configured to output the UUT and may include a fourth transfer device having one or more tiers.

The exit point may be configured to receive and to output the UUT in the first transport level and the fourth transfer device may be configured to move the UUT between the one or more tiers within the first transport level.

The fourth transfer device may include a shelf system having the one or more tiers for at least one shelf and an end-effector configured to move a UUT from the at least one shelf towards the output of the exit point.

The multiple transport level tester system may include a linear footprint that is about 30%-70% less than a linear arrangement in one transport level of at least the entry point, the exit point, the first environmental conditioning chamber, the second environmental conditioning chamber, and the first test station.

The UUT may include a semiconductor-based power module.

A multiple transport level tester system of some embodiments includes an entry point, at least one exit point, a first transport level having a first level, and at least one additional transport level having at least one additional level. The first level is different than the at least one additional level. The multiple transport level tester system further includes at least one environmental conditioning chamber configured to perform an environmental conditioning on a plurality of units under test; and at least one test station configured to perform at least one test on the plurality of units under test.

The entry point and the at least one exit point may be configured at one or more of the first end, the second end, the first side, and the second side, and at least one of the first end and the second end of the multiple transport level tester system.

The first level and the at least one additional levels, respectively, may be substantially level between the first and second ends of the multiple transport level tester system.

The first level may have a variable level within the first transport level.

The at least one additional level may have a variable level within the at least one additional transport level.

The entry point may be configured to receive the unit under test and may include a first transfer device configured to handle one or more tiers.

The entry point may be configured to receive the unit under test in the at least one additional transport level and the first transfer device may be configured to move the unit under test between the one or more tiers within the at least one additional transport level.

The entry point may be configured to receive the unit under test in the first transport level and the first transfer device may be configured to move the unit under test between the one or more tiers within the first transport level.

The first transfer device may include a shelf system having the one or more tiers for at least one shelf and an end-effector configured to move a unit under test from the at least one shelf towards the first test station.

The first test station may be configured to receive and to output the unit under test in the at least one additional transport level.

The first test station may be configured to receive and to output the unit under test in the first transport level.

The at least one environmental conditioning chamber may be configured to receive and to output the unit under test in the at least one additional transport level.

The at least one environmental conditioning chamber may be configured to receive the unit under test in the at least one additional transport level and to output the unit under test in the first transport level.

The at least one environmental conditioning chamber may be configured to receive the unit under test in the first transport level and to output the unit under test in the at least one additional transport level.

The least one environmental conditioning chamber may be configured to receive the unit under test and may include a second transfer device having one or more tiers, the second transfer device configured to move the unit under test between the one or more tiers.

The at least one environmental conditioning chamber may be configured to receive the unit under test in the at least one additional transport level and the second transfer device may be configured to output the unit under test in the at least one additional transport level.

The at least one environmental conditioning chamber may be configured to receive the unit under test in the at least one additional transport level and the second transfer device may be configured to output the unit under test in the first transport level.

The at least one environmental conditioning chamber may be configured to receive the unit under test in the first transport level and the second transfer device may be configured to output the unit under test in the at least one additional transport level.

The second transfer device may include at least one of (i) a belt-driven conveyor; (ii) a chain-driven conveyor; (iii) a cable-driven conveyor; (iv) a 2-or-more axis robot and (v) a shelf system having a respective shelf at a tier in the one or more tiers and an end-effector configured to move the unit under test towards an output of the at least one environmental conditioning chamber.

The at least one environmental conditioning chamber may include an environmental controller configured to control at least one of (i) a temperature, (ii) an atmospheric condition, (iii) a humidity, (iv) electromagnetic radiation, and (v) a pressure.

The at least one exit point may be configured to receive and to output the unit under test in the first transport level and the fourth transfer device may be configured to move the unit under test between the one or more tiers within the first transport level.

The fourth transfer device may include a shelf system having the one or more tiers for at least one shelf and an end-effector configured to move a unit under test from the at least one shelf towards the output of the exit point.

The multiple transport level tester system may include a linear footprint that is about 30%-70% less than a linear arrangement in one transport level of at least the entry point, the at least one exit point, the at least one environmental conditioning chamber, and the first test station.

Additional features, advantages, and aspects of the disclosure may be set forth or apparent from consideration of the following detailed description, drawings, and claims. Moreover, it is to be understood that both the foregoing summary of the disclosure and the following detailed description includes examples and intended to provide further explanation without limiting the scope of the disclosure as claimed.

BRIEF DESCRIPTION OF THE DRAWINGS

The accompanying drawings, which are included to provide a further understanding of the disclosure, are incorporated in, and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIGS. 4A-4C are schematic diagrams illustrating further example embodiments of a conveyor configuration of a transfer device of a first environmental conditioning chamber and/or a second environmental conditioning chamber, respectively, according to some embodiments of the present disclosure.

FIGS. 5A-5C illustrate another example embodiment of a transfer device of a first environmental conditioning chamber according to some embodiments of the present disclosure.

FIGS. 6A-6C illustrate another example embodiment of a transfer device of a second environmental conditioning chamber according to some embodiments of the present disclosure.

FIG. 13 is a block diagram illustrating a top view of an example embodiment of a multiple transport level tester system according to some embodiments of the present disclosure.

FIGS. 14A-14F are block diagrams illustrating top views of example embodiments of entry and exit points of the multiple transport level tester system of FIG. 13 according to some embodiments of the present disclosure.

DETAILED DESCRIPTION OF THE DISCLOSURE

Figure 1:
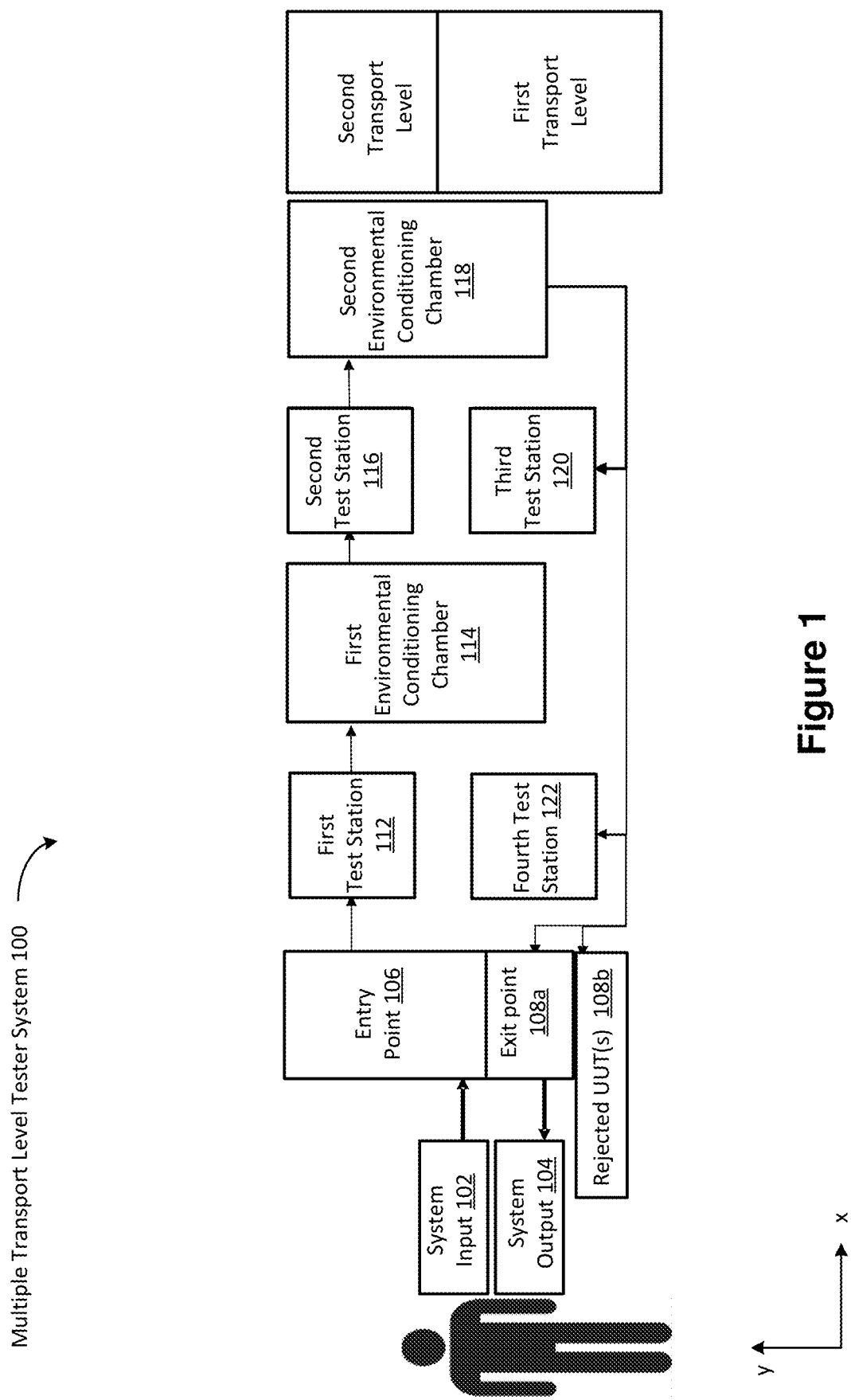
FIG. 1 is a block diagram illustrating a multiple transport level tester system 100 according to some embodiments of the present disclosure.

Embodiments of the inventive concepts are explained more fully with reference to the non-limiting aspects and examples that are described and/or illustrated in the accompanying drawings and detailed in the following description. It should be noted that the features illustrated in the drawings are not necessarily drawn to scale, and features of some embodiments may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

It will be understood that, although the terms first, second, etc. may be used herein to describe various elements, these elements should not be limited by these terms. These terms are only used to distinguish one element from another. For example, a first element, first transport level, or first level could be termed a second element, second transport level, or second level, and, similarly, a second element, second transport level, or second level could be termed a first element, a first transport level, or first level, without departing from the scope of the disclosure. As used herein, the term "and/or" includes any and all combinations of one or more of the associated listed items.

It will be understood that when an element such as a component, region, layer, tier, or level is referred to as being "in" or "on" another element, it can be directly on or extend directly onto the another element or intervening elements may also be present. In contrast, when an element is referred to as being "directly on" or "directly onto" another element, there are no intervening elements present. Likewise, it will be understood that when an element such as a component, region, layer, tier or level is referred to as being "over" or extending "over" another element, it can be directly over or extend directly over the another element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the another element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one component, element, layer, region, tier, or level to another component, element, layer, region, tier, or level as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Use of floorspace of tester systems is inefficient and expensive. Additionally, throughput time and capacity of the number of UUTs handled may be limited. The capacity of UUTs processed by a tester system is based in part on the number of UUTs that fit in the tester system. Such limitations on floor space usage, throughput and/or capacity can result in increased costs and in delays in both ensuring an acceptable number of UUTs are reliable and satisfy the testing requirements; and identifying a number of UUTs that fail to satisfy testing requirements and, thus, whether a manufacturing issue(s) exists for which remedial measures may be desired.

The present disclosure is directed to a multiple transport level tester system configured to implement test conditions and testing of UUTs that reduces floor space occupied by a tester system. Moreover, some embodiments increase the throughput and capacity of the amount of UUTs tested and, thus, reduces the amount of time needed to determine whether a UUT satisfies or fails tests implemented in the multiple transport level tester system.

Existing tester systems include various tests used to determine performance of or a characteristic of a UUT. Tests can include, without limitation, hot temperature tests, ambient temperature tests, alternating current (AC)/direct current (DC) test capability at a hot temperature and/or at an ambient temperature, switching tests, high potential (HiPot) tests, weight control tests, optical inspection tests, International Organization for Standardization (ISO tests), etc. A UUT can fail to meet one or more of the test criteria and, therefore, be identified as a rejected UUT. The ability to efficiently use floor space occupied by existing tester systems configured in a linear dimension in a single level is lacking. Additionally, the ability to accelerate the identification and amount of acceptable and rejected UUTs with such systems is lacking.

In some embodiments. based on inclusion of a multiple transport level tester system of the present disclosure, the multiple transport level tester system can reduce the amount of floor space taken up by the components of the multiple transport level tester system by about 30% to about 70% (or greater). Moreover, the inclusion in some embodiments, of a transfer device(s) having multiple tiers within an entry point, and exit point, a first environmental conditioning chamber, and/or a second environmental conditioning chamber of the multiple transport level tester system, allows times to be reduced for throughput and greater capacities of UUTs.

Some embodiments of the present disclosure provide a multiple transport level tester system that includes an entry point, an exit point, a first transport level having a first level, and a second transport level having a second level, where the first level is different than the second level. The multiple transport level tester system further includes a first environmental conditioning chamber configured to perform a first environmental conditioning on a UUT; a second environmental conditioning chamber configured to perform a second environmental conditioning on the UUT; and a first test station configured to perform a first test on the UUT.

In some embodiments, the multiple transport level tester system further includes a first end of the multiple transport level tester system; and a second end of the multiple transport level tester system; a first side of the multiple transport level tester system; and a second side of the multiple transport level tester system. The multiple transport level tester is configured between the first end and the second end and between the first side and the second side.

The multi transport level tester system can further include vision based components, laser marking components, weigh stations, etc. incorporated either internal to the transport levels or as part of a configurable implementation of the entry and exits points.

FIG. 1 is a block diagram illustrating an example multiple transport level tester system 100 according to some embodiments of the present disclosure. For ease of discussion, example embodiments herein are discussed with reference to a multiple transport level tester system configured to test UUTs that include semiconductor based power modules (e.g., silicon carbide (SiC) power modules). The present disclosure, however, is not so limited. Instead, the multiple transport level tester system may be configured to test, including without limitation, the following additional examples of UUTs: medical components/devices, electronic components, computer components, consumer products, other semiconductor devices, etc. Moreover, while certain example embodiments are discussed herein with respect to a first environmental conditioning chamber that is a heating chamber and a second environmental conditioning chamber that is a cooling chamber, the disclosure is not so limited. Instead, the first environmental conditioning chamber may be a cooling or other temperature conditioning chamber and the second environmental conditioning chamber may be a heating chamber of other temperature conditioning chamber.

While test stations of example embodiments are discussed herein that can perform certain tests on UUTs at different temperatures (e.g., a room temperature and an elevated temperature), other test stations and components may be included. For example, tests stations may be included that perform other tests, including without limitation, the following additional examples of tests: weight, optical, other tests of electrical or other performance properties of a UUT, etc.

It also is noted that the multiple transport level tester system 100 is merely an example and may be modified consistent with the various aspects disclosed herein. For example, the positioning of the components of the multiple transport level tester system 100 can be modified in various different positions in a plurality of different transport levels and/or different levels within a transport level, as illustrated for example in the non-limiting examples in FIGS. 1 and 8-12 discussed further herein. Moreover, the components and number of components of the multiple transport level tester system 100 can be modified to have more or fewer components than that illustrated in the example in FIG. 1, and to have components that implement different test conditions, procedures, and/or different tests consistent with the various aspects disclosed herein. For example, the multiple transport level tester system can have transport levels of any number N greater than two and components of any number N greater than one (e.g., one environmental conditioning chamber, three environmental conditioning chambers, one test station, five test stations, one weigh station, etc.) that can be configured according to particular tests and procedures to be performed with the multiple transport level tester system.

The multiple transport level tester system 100 depicted in the example in FIG. 1 includes components configured in a first transport level and in a second transport level, as illustrated. In the example embodiment of FIG. 1, the first transport level includes: an input to system input 102 and entry point 106 in the first transport level; an input and output of; a portion of the first environmental conditioning chamber 114 (e.g., a heating chamber); an input and output of third test station 120; an output of the second environmental conditioning chamber 118 (e.g., a cooling chamber); an output of system output 104; and an input to rejected UUT(s) 108b. The second transport level includes: an output of entry point 106; an input and output of first test station 112; an input and output of first environmental conditioning chamber 114; an input and output of second test station 116; and in input to second environmental conditioning chamber 118.

As shown in the example of FIG. 1, in the y-direction of FIG. 1, the first transport level extends from about a level of a floor to a level corresponding to about the height of the illustrated person; and the second transport level extends from a level at about a height of the illustrated person to a level corresponding to a height of a tallest component in the second transport level. While the heights of the components illustrated in the second transport level in FIG. 1 are about the same, in practice, heights of components included within a transport layer may be varied at different levels within a transport level.

Moreover, as illustrated in FIG. 1 and discussed further herein, inputs/outputs of various components within a transport level can be at substantially the same level, as illustrated by the arrows in the second transport level depicting flow of a UUT(s) into entry point 106, into and out of first test station 112, into and out of first environmental conditioning chamber 114, into and out of second test station 116, and into second environmental conditioning chamber 118. As further illustrated in FIG. 1, input/outputs of various components within a transport level can be at different levels, as illustrated by the arrows in the first transport level depicting flow of a UUT(s) out of the second environmental conditioning chamber 118, into/out of third test station 120 and fourth test station 122, and out of exit point 108a, rejected UUT(s) 108b, and system output 104.

In some embodiments, the first level of the first transport level and the second level of the second transport level, respectively, are substantially level between the first and second ends of the multiple transport level tester system.

The first level of the first transport level, in some embodiments, has a variable level within the first transport level. The second level of the second transport level, in some embodiments, has a variable level within the second transport level.

An example embodiment of the multiple transport level tester system 100 of FIG. 1 is now discussed in which the multiple transport level tester system 100 is configured to perform various tests on semiconductor based power modules at different temperatures. A UUT(s) comprising a semiconductor based power module(s) is input to system input 102 via a transfer mechanism, such as a conveyor. The system input 102 is connected to entry point 106, which may also include components for identifying the UUT. As discussed further herein, in some embodiments, an entry point is configured to receive the UUT and includes a first transfer device having one or more tiers. The entry point 106, as shown in this example in FIG. 1, is configured to receive a UUT(s) in the first transport level and to output the UUT(s) in the second transport level. Entry point 106 is further configured to output the UUT(s) onto a transfer mechanism (e.g., a conveyor (which can include any mechanism that conveys such as a conveyor belt, a ferris-wheel style conveyor, etc.) or multi-axis end-effector), and the transfer mechanism inputs the UUT(s) to first test station 112 positioned in the second transport level. In an example embodiment, the entry point is configured to receive the UUT in the second transport level and the first transfer device is configured to move the UUT between the one or more tiers within the second transport level.

It also is noted that the entry point and exit point to the multiple transport level tester system 100 in various of the Figures herein are merely examples and may be modified consistent with the various aspects disclosed herein. For example, FIG. 13 is a block diagram illustrating a top view of an example embodiment of a multiple transport level tester system according to some embodiments of the present disclosure. As illustrated in FIG. 13, there can be a "consolidated" entry point and exit point 1300 (e.g., in place of system input 102, system output 104, entry point 106, exit point 108*a*, and rejected UUT(s) 108*b* illustrated in various of FIGS. 1-12). The consolidated entry point and exit point 1300 may include one entry point/exit point component or separate components for the entry point and the exit point at approximately a same location in the multiple transport level tester system 100 as illustrated, for example, in FIG. 13. A robot 1302 can be positioned inside the entry point and exit point 1300 to route UUT(s) in and out of the multiple transport level tester system 100, which can also include routing rejected UUT(s) out of the multiple transport level tester system 100.

Figure 14C:
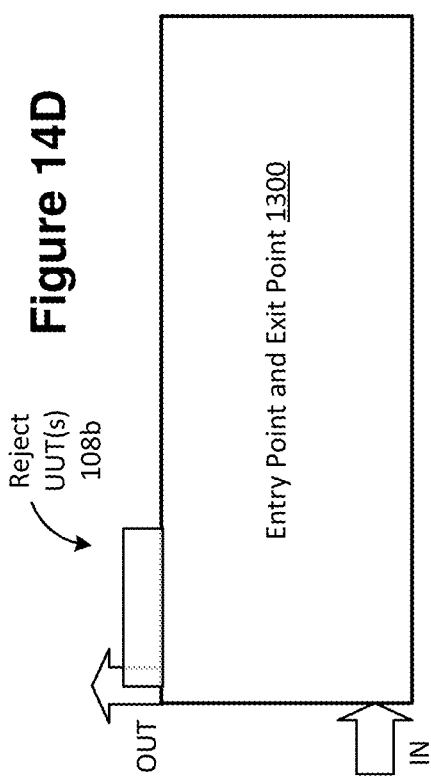

FIGS. 14A-14F are block diagrams illustrating top views of example embodiments of entry and exit points of the multiple transport level tester system of FIG. 13 according to some embodiments of the present disclosure. As shown in FIG. 14A, entry point and exit point 1300 can include an input on a first side of the entry point and exit point 1300 and an output (which can include an output for rejected UUT(s)) on a second side of the entry point and exit point 1300 opposite the first side.

As shown in FIG. 14B, entry point and exit point 1300 can include an input on a first end of the entry point and exit point 1300 and an output (which can include an output for rejected UUT(s)) on the first end of the entry point and exit point 1300.

In another example, as shown in FIG. 14C, entry point and exit point 1300 can include an input on a first side of the entry point and exit point 1300 and an output (which can include an output for rejected UUT(s)) on a first end of the entry point and exit point 1300.

Figure 14D:
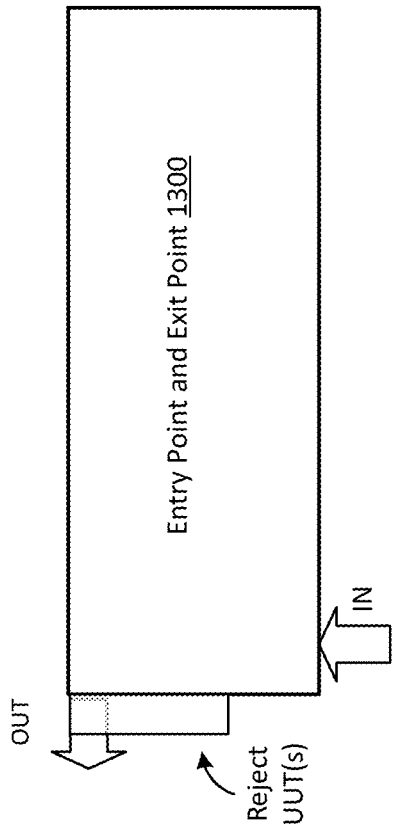

In yet another example, shown in FIG. 14D, entry point and exit point 1300 can include an input on a first end of the entry point and exit point 1300 and an output (which can include an output for rejected UUT(s)) on a second side of the entry point and exit point 1300.

Figure 14E:
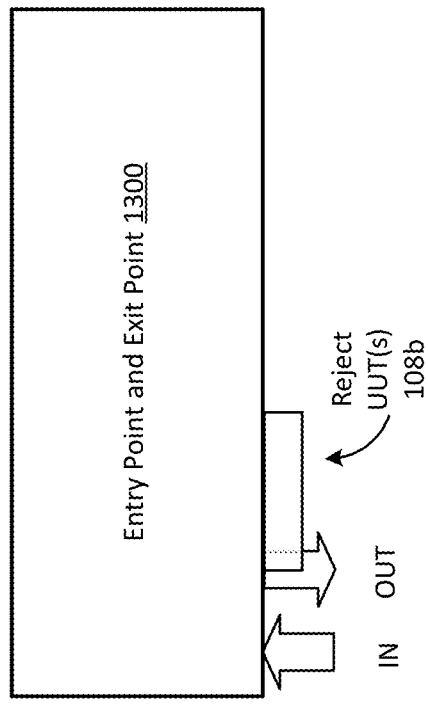

As shown in the example in FIG. 14E, entry point and exit point 1300 can include an input on a first side proximate a first end of the entry point and exit point 1300 and an output (which can include an output for rejected UUT(s)) on the first side proximate a second end of the entry point and exit point 1300.

Figure 14F:
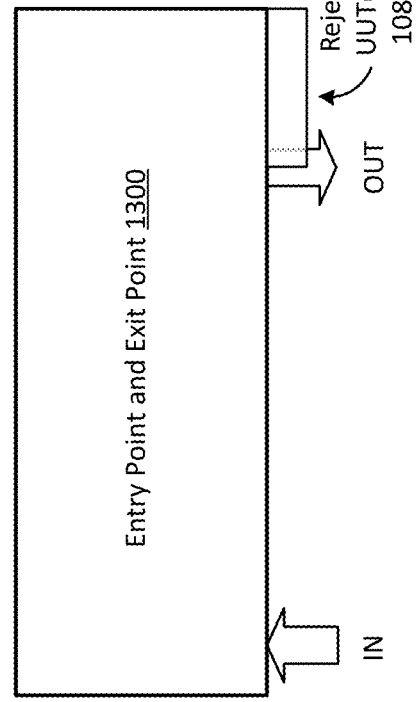

In another example, as shown in FIG. 14F, entry point and exit point 1300 can include an input on a first side proximate a first end of the entry point and exit point 1300 and an output (which can include an output for rejected UUT(s)) on the first side proximate the input of the entry point and exit point 1300.

In some examples, the entry and exit points also can be configured on any one of multiple transport levels, including on a same transport level or the entry point can be on one transport level and the exit point be on another transport level.

In some examples, the exit point can include multiple exit points to route a UUT(s) to different locations based on test results throughout the multiple transport level system.

In some embodiments, the exit point includes a conveyor that moves passing UUT(s) and failing UUT(s) to different locations in the multiple transport level tester system and a next component in transport picks up/receives the UUT(s).

First test station 112, in this example, is a room temperature HiPot test station that tests the semiconductor based power module(s) at about a room temperature and a high voltage to determine whether the semiconductor based power module satisfies electrical safety tests (e.g., dielectric withstand and insulation resistance tests). Upon completion of testing in first test station 112, a transfer mechanism (e.g., a conveyor) moves the semiconductor based power module(s) to an input of the first environmental conditioning chamber 114, which in this example is a heating chamber. In an example embodiment, a first test station is configured to receive and to output the UUT in the second transport level.

As illustrated in the example embodiment of FIG. 1, first environmental conditioning chamber 114 is configured to receive and to output the UUT(s) in the second transport level. First environmental conditioning chamber 114 (e.g., a heating chamber) is an enclosed or partially enclosed chamber (e.g., insulated chamber) that is configured to be held at a desired temperature. When first environmental conditioning chamber 114 is a heating chamber, it can be configured to provide the desired temperature with heated surfaces and/or radiative and/or conductive heating. First environmental conditioning chamber 114 further can include a second transfer device having multiple tiers that is configured to move a UUT(s) between levels during the environmental conditioning. In an example embodiment, the first environmental conditioning chamber is configured to receive the UUT and includes a second transfer device having one or more tiers, where the second transfer device is configured to move the UUT between the one or more tiers. In some embodiments, the first environmental conditioning chamber is configured to receive the UUT in the second transport level and the second transfer device is configured to output the UUT in the second transport level.

Once the UUT(s), in the example of FIG. 1, is heated to about a desired, elevated temperature, the UUT(s) are moved on a transfer mechanism (e.g., a conveyor) with independent environmental control and monitoring apparatus (for fine adjustment) from an output of the first environmental conditioning chamber in the second transport level to an input of second test station 116 in the second transport level.

Second test station 116, in this example, is an elevated temperature DC test station that tests the semiconductor based power module(s) at an elevated temperature to measure various properties of the semiconductor based power module at high voltage/high current at the elevated temperature. Upon completion of the testing in second test station 116, a transfer mechanism (e.g., a conveyor) moves the semiconductor based power module(s) to an input in the second transport level of the second environmental conditioning chamber 118, which is a cooling chamber in this example. For example, in some embodiments, the multiple transport level tester systems further includes a second test station configured to receive and to output the UUT in the second transport level.

As illustrated in the example embodiment of FIG. 1, second environmental conditioning chamber 118 is configured to receive the UUT(s) in the second transport level and to output the UUT(s) in the first transport level. Second environmental conditioning chamber 118 is an enclosed or partially enclosed environment that, in this example, is configured to provide chilled surfaces and/or airflow to provide radiative and/or conductive cooling; and includes a third transfer device having multiple tiers is configured to move UUTs between tiers during the environmental conditioning (e.g., cooling in this example). In some embodiments, the second environmental conditioning chamber is configured to receive the UUT in the second transport level and the third transfer device is configured to output the UUT in the first transport level.

Once the UUTs are, in this example, cooled to about a desired, ambient temperature (as further discussed herein), the UUT(s) are moved on a transfer mechanism (e.g., a conveyor) from the output of the second environmental conditioning chamber in the first transport level to third test station 120, which is configured to receive the UUT in the first transport level, but at a different level in the first transport level than the level of the output of the second environmental conditioning chamber 118. In some embodiments, the multiple transport level tester system further includes a third test station configured to receive and to output the UUT in the first transport level.

Third test station 120, in this example, is an ambient temperature AC test station that tests the semiconductor based power module(s) at an ambient temperature to measure various properties of the semiconductor based power module at high voltage/high current at the ambient temperature. Upon completion of the testing in third test station 120, a transfer mechanism (e.g., a conveyor) moves the semiconductor based power module(s) to an input of fourth test station 122 in the first transport level. In some embodiments, the multiple transport level tester system further includes a fourth test station configured to receive and to output the UUT in the first transport level.

Fourth test station 122, in this example is, is an ambient temperature DC test station that tests the semiconductor based power module(s) at an ambient temperature to measure various properties of the semiconductor based power module at high voltage/high current at the ambient temperature. Upon completion of the testing in fourth test station 122, a transfer mechanism (e.g., a conveyor) moves the semiconductor based power module(s) that satisfied the various tests to exit point 108a configured to receive and output the UUT(s) in the first transport level (but at different levels as shown in FIG. 1), and moves the semiconductor based power module(s) that failed to satisfy one or more of the various tests to rejected UUTs component 110 configured to receive UUT(s) in the first transport level at yet another level.

As discussed further herein, exit point 108a can include a fourth transfer device having multiple tiers of UUTs inside the exit point 108a. The UUTs are output from exit point 108a onto another transfer mechanism (e.g., a conveyor), and the transfer mechanism provides the UUTs to system output 104 configured to receive and to output the UUT(s) in the first transport level.

In some embodiments, the exit point is configured to output the UUT and includes a fourth transfer device having one or more tiers. The exit point, in some embodiments, is configured to receive and to output the UUT in the first transport level and the fourth transfer device is configured to move the UUT between the one or more tiers within the first transport level.

As illustrated in FIG. 1, entry point 106 can be adjacent to point 108a. In some embodiments, the entry point is adjacent to the exit point. In other embodiments, the entry point and the exit point are at one of the first end and the second end of the multiple transport level tester system.

In some embodiments, the first and second environmental conditioning chambers, respectively, include an environmental controller configured to control at least one of (i) a temperature, (ii) an atmospheric condition, (iii) a humidity, (iv) electromagnetic radiation, and (v) a pressure. For example, an environmental conditioning chamber may have an environmental controller that controls a temperature (e.g., heat or cool) and an inert gas environment (e.g., nitrogen) inside the chamber.

In some embodiments, the first and/or second environmental conditioning chamber includes a heating chamber. In some embodiments, the first and/or second environmental conditioning chamber includes a cooling chamber.

A multiple transport level tester system of some embodiments includes an entry point, an exit point, a first transport level having a first level, and at least one additional transport level having at least one additional level. The first level is different than the at least one additional level. The multiple transport level tester system further includes at least one environmental conditioning chamber configured to perform an environmental conditioning on a plurality of units under test; and at least one test station configured to perform at least one test on the plurality of units under testone environmental conditioning chamber.

Figure 2A:
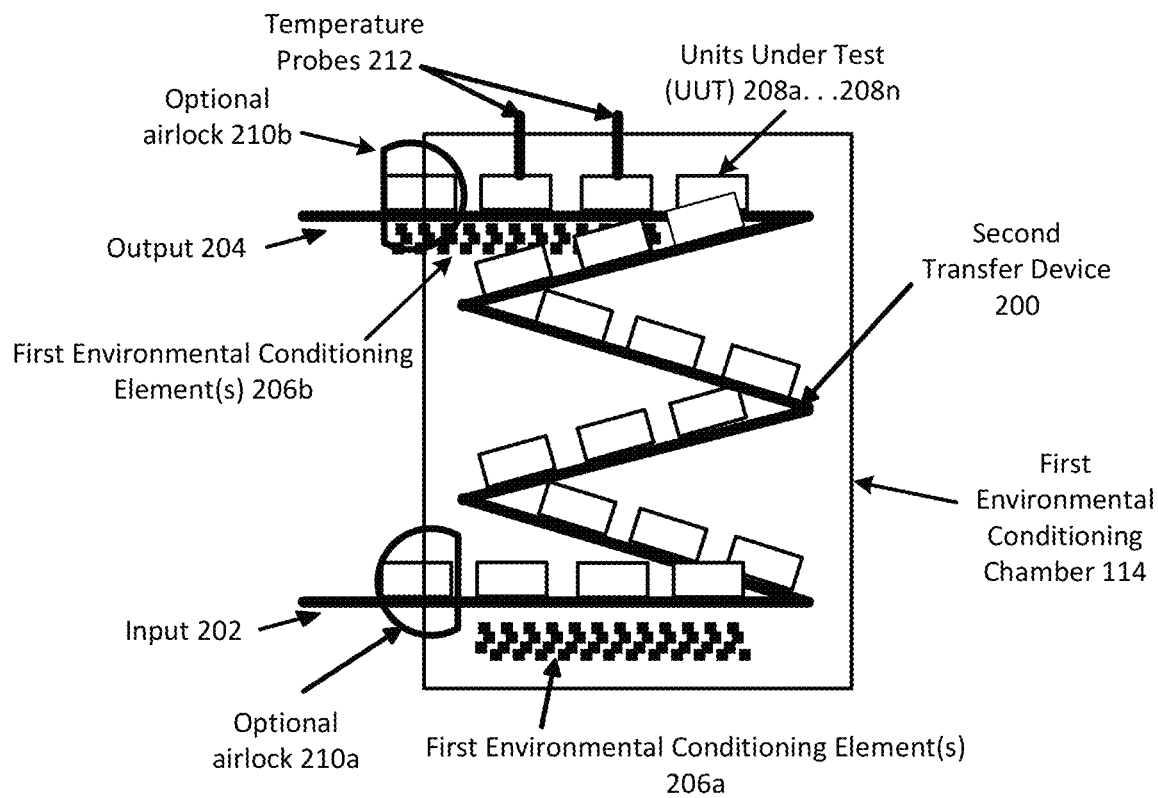
FIGS. 2A and 2B are schematic diagrams illustrating example embodiments of a first environmental conditioning chamber that includes a transfer device according to some embodiments of the present disclosure.
Figure 2B:
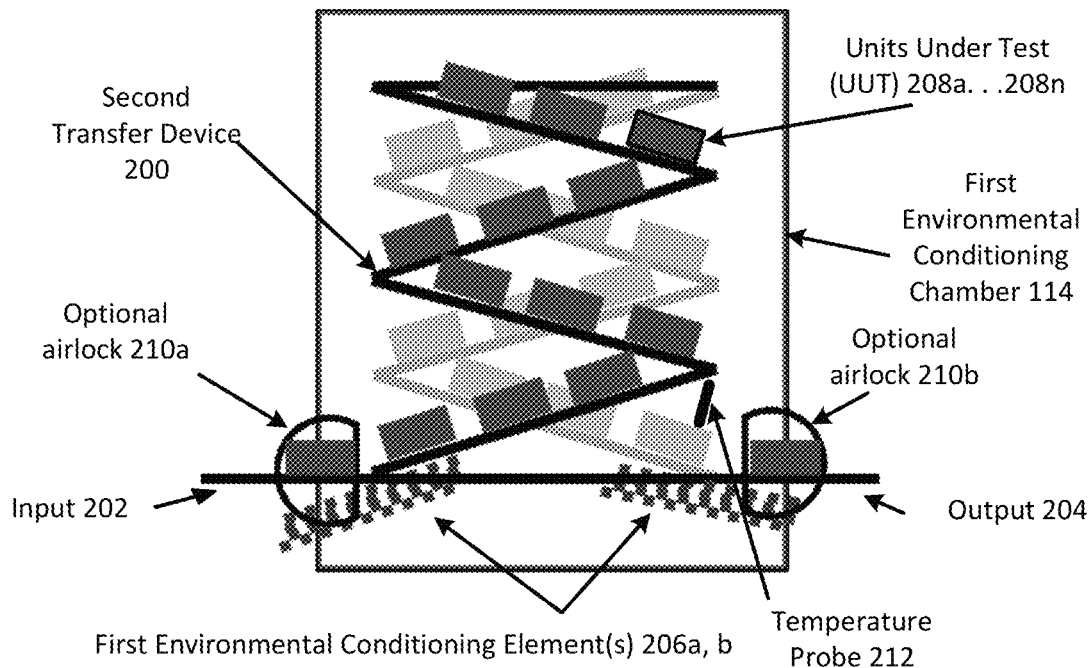

FIGS. 2A and 2B are schematic diagrams illustrating example embodiments of first environmental conditioning chamber 114 that includes a second transfer device 200. FIG. 2A shows an example where input 202 and an output 204 of the first environmental conditioning chamber are on the same side of the first environmental conditioning chamber 114, but at different levels within a transport level(s). FIG. 2B shows an example where input 202 and output 204 are on opposite sides of the first environmental conditioning chamber 114, but at about the same level within a transport level. The direction and and/or level that the UUTs 208a . . . 208n exit from the inside of first environmental conditioning chamber 114 can be adjusted by choosing where the UUTs 208a . . . 208n are to exit from the second transfer device 200.

Referring to the example shown in FIG. 1, before reaching the interior of first environmental conditioning chamber 114, a transfer mechanism (e.g., a conveyor) moves UUTs 208a . . . 208n from the output of first test station 112 to input 202 of the first environmental conditioning chamber 114. Optionally, input 202 to the first environmental conditioning chamber 114 can include an airlock 210a. First environmental conditioning chamber 114 can also include first environmental conditioning elements (e.g., heating elements) 206a, 206bm (e.g., proximate the input 202 and output 204, respectively, of first environmental conditioning chamber 114) to, e.g., raise and/or hold the interior of for example, heating elements to about the desired temperature. Temperature probes 212 can be included to ensure that UUTs 208a . . . 208n proximate output 204 of the for example, first environmental conditioning chamber 114 have about a correct temperature (e.g., a substrate temperature of a semiconductor based power module). Optionally, output 204 also can include an airlock 210b.

In the examples of FIGS. 2A, 2B, second transfer device 200 inside the first environmental conditioning chamber 114 is a conveyor that can be implemented with belts and motorized rollers, for example. As depicted in FIGS. 2A and 2B, the second transfer device 200 has multiple tiers that are configured to transfer UUTs 208a . . . 208n between tiers during heating, for example. In the example of FIG. 1, once the UUTs are heated to about a desired temperature, the UUT(s) are moved on a transfer mechanism (e.g., a conveyor) from output 204 of the first environmental conditioning chamber to second test station 116.

Figure 2C:
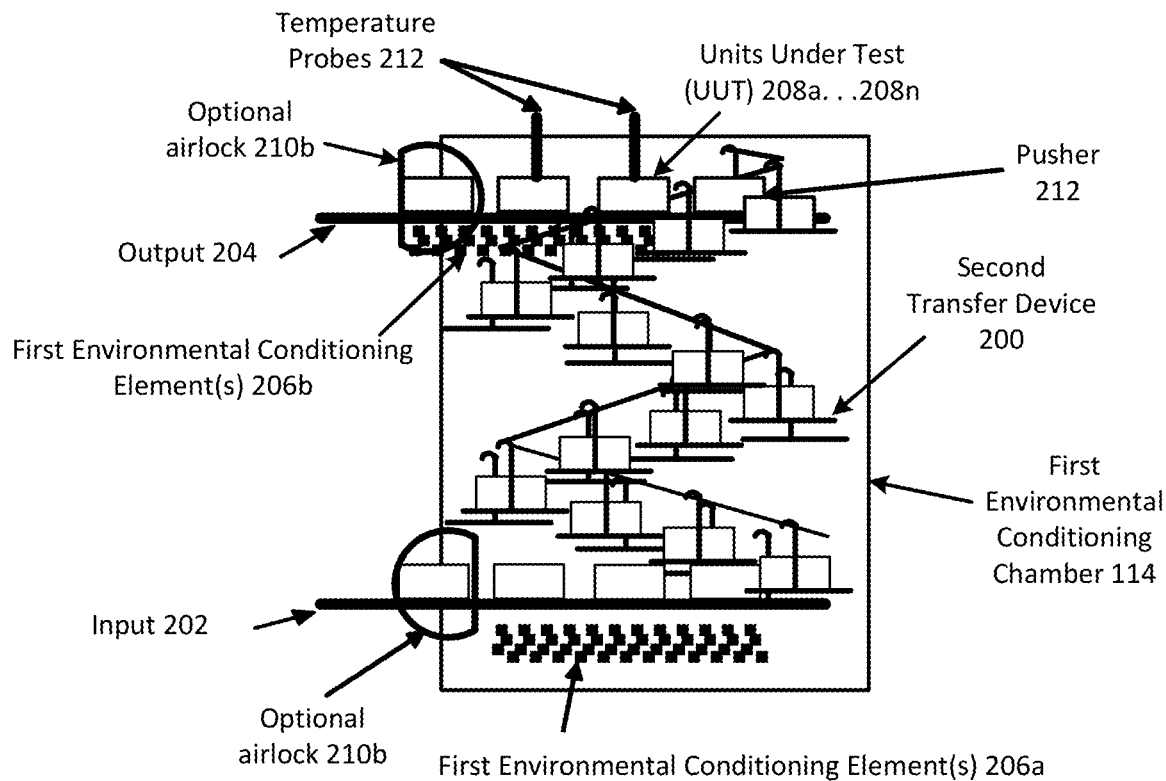
FIGS. 2C and 2D are schematic diagrams illustrating other example embodiments of a transfer device of a first environmental conditioning chamber according to some embodiments of the present disclosure.
Figure 2D:
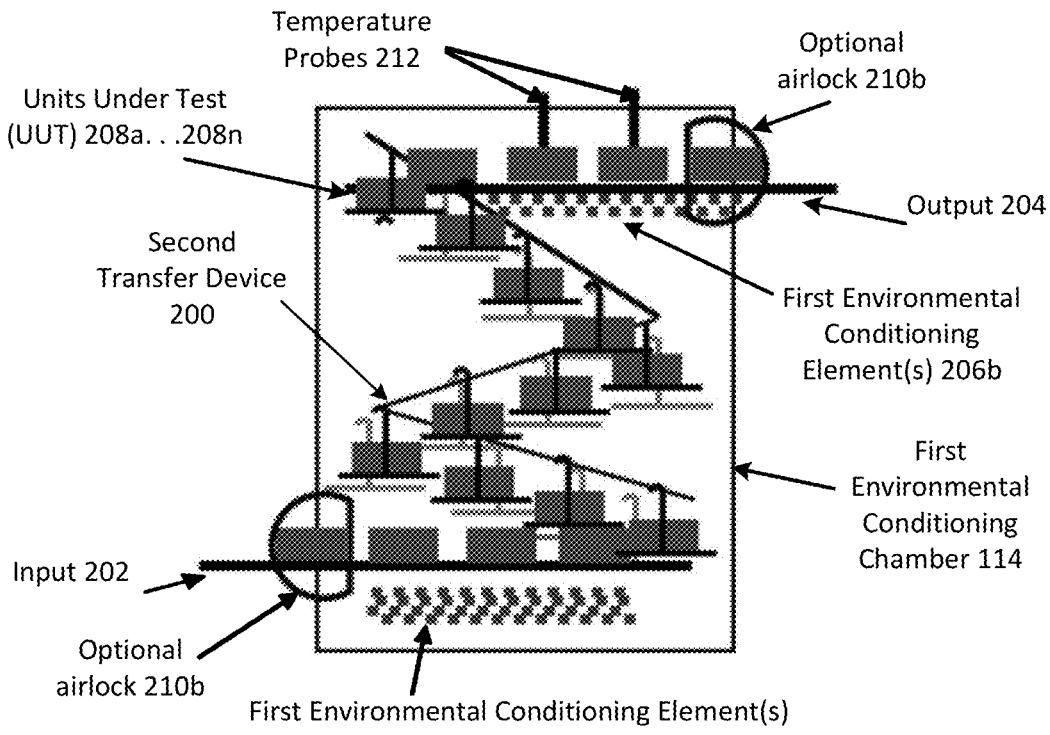

FIGS. 2C and 2D are schematic diagrams illustrating other example embodiments of the second transfer device 200 of first environmental conditioning chamber 114. Features that are similar to features described above in FIGS. 2A and 2B will not be repeated here. In the examples of FIGS. 2C, 2D, second transfer device 200 inside the first environmental conditioning chamber 114 is a conveyor that includes an initial conveyor belt length that is proximate input 202, transitions to a conveyor chain drive having "chairlift" style platforms, and then transitions to another length of conveyor belt that is proximate to the output 204. Near the top tier of transfer device 200, a pusher 212 can be included that is configured to move UUTs 208a . . . 208n off their respective platforms and onto the final length of the conveyor. As depicted in FIGS. 2C and 2D, second transfer device 200 has multiple tiers and is configured to move UUTs 208a . . . 208n between tiers during heating, for example. In the example of FIG. 1, once the UUTs are heated to about a desired temperature, the UUT(s) are moved on a transfer mechanism (e.g., a conveyor) from output 204 of the first environmental conditioning chamber 114 to second test station 116.

Figure 3A:
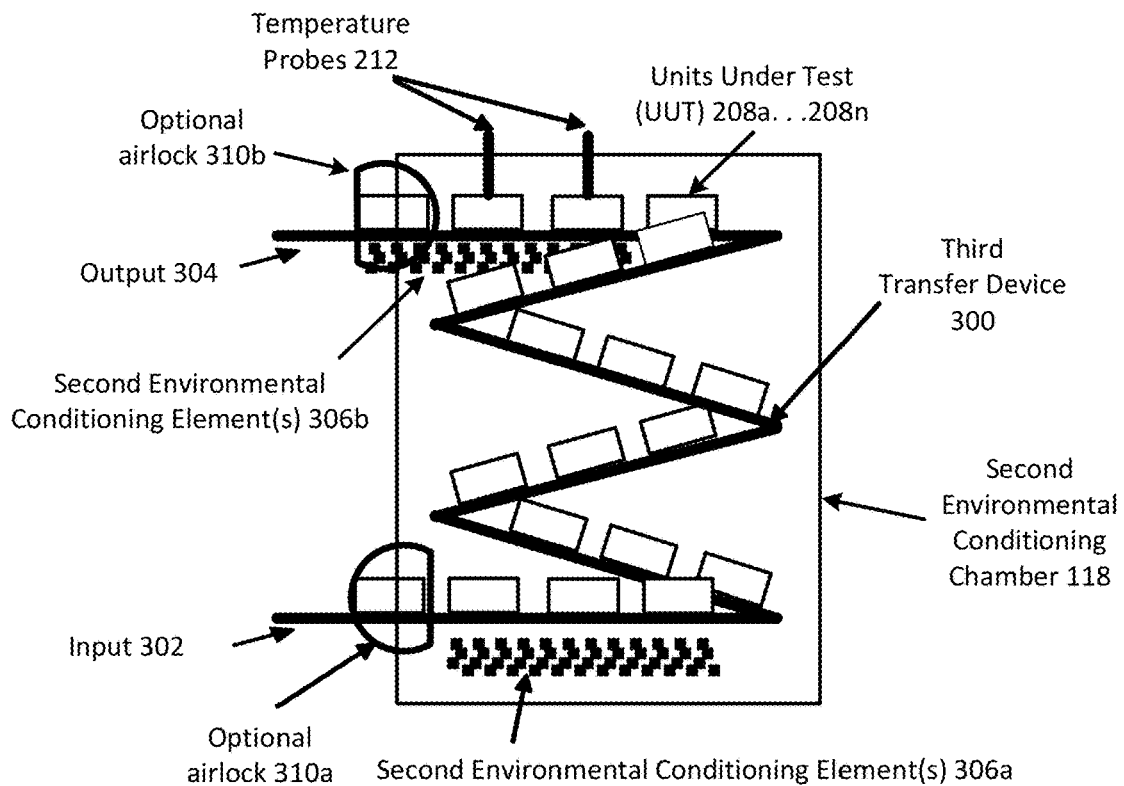
FIGS. 3A and 3B are schematic diagrams illustrating example embodiments of a second environmental conditioning chamber that includes a transfer device according to some embodiments of the present disclosure.
Figure 3B:
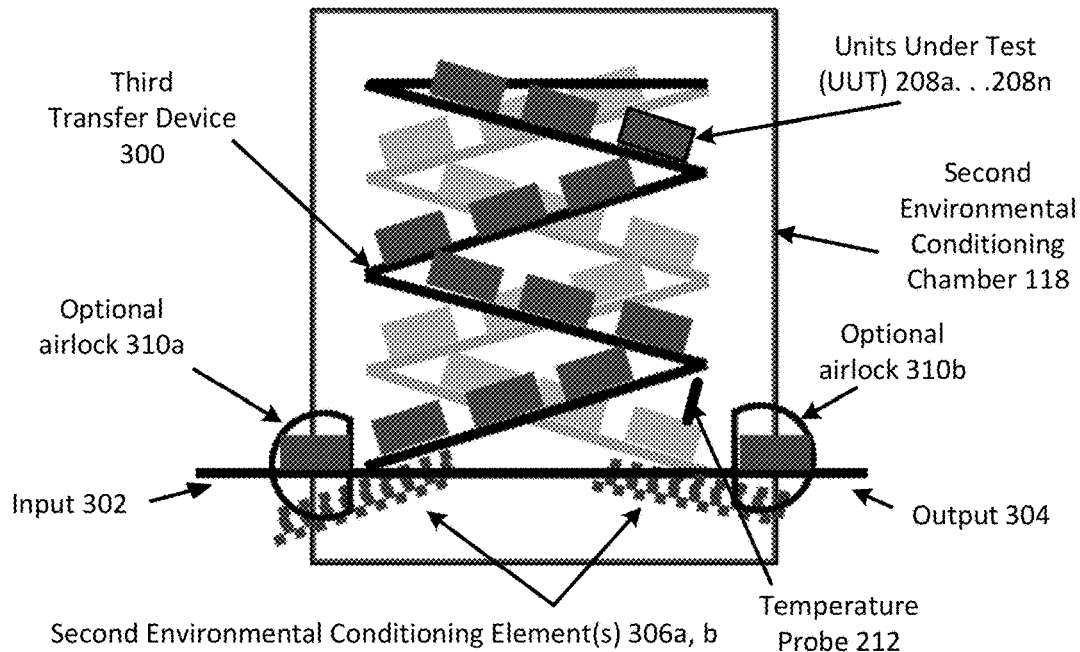

FIGS. 3A and 3B are schematic diagrams illustrating example embodiments of second environmental conditioning chamber 118 that includes a third transfer device 300. FIG. 3A shows an example where input 302 and an output 304 of the second environmental conditioning chamber are on the same side of the second environmental conditioning chamber 118, but at different levels within a transport level(s). FIG. 3B shows an example where input 302 and output 304 are on opposite sides of the second environmental conditioning chamber 118, but at about the same level of a transport level. The direction and and/or level that the UUTs 208a . . . 208n exit from the inside of second environmental conditioning chamber 118 can be adjusted by choosing where the UUTs 208a . . . 208n are to exit from the third transfer device 300.

In the example of FIG. 1, before reaching the interior of second environmental conditioning chamber 118, a transfer mechanism (e.g., a conveyor) moves UUTs 208a . . . 208n from the output of second test station 116 to input 302 of the second environmental conditioning chamber 118. Optionally, input 302 to the second environmental conditioning chamber 118 can include an airlock 310a. Second environmental conditioning chamber 118 can also include second environmental conditioning elements (e.g., cooling elements) 306a, 306b (e.g., proximate the input 302 and output 304, respectively, of second environmental conditioning chamber 118) to decrease and/or hold the interior of the second environmental conditioning chamber 118 to about the desired temperature, for example. Temperature probes 312 can be included to ensure that UUTs 208a . . . 208n proximate output 304 of the second environmental conditioning chamber 118 have about a correct temperature (e.g., a substrate temperature of a semiconductor based power module). Optionally, output 304 also can include an airlock 310b.

In the examples of FIGS. 3A, 3B, third transfer device 300 inside the second environmental conditioning chamber 118 is a conveyor that can be implemented with belts and motorized rollers, for example. As depicted in FIGS. 3A and 3B, third transfer device 300 has multiple tiers and is configured to transfer UUTs 208a . . . 208n between tiers during cooling, for example. In the example of FIG. 1, once the UUTs are cooled to about a desired temperature, the UUT(s) are moved on a transfer mechanism (e.g., a conveyor) from output 304 of the second environmental conditioning chamber to third test station 120.

Figure 3C:
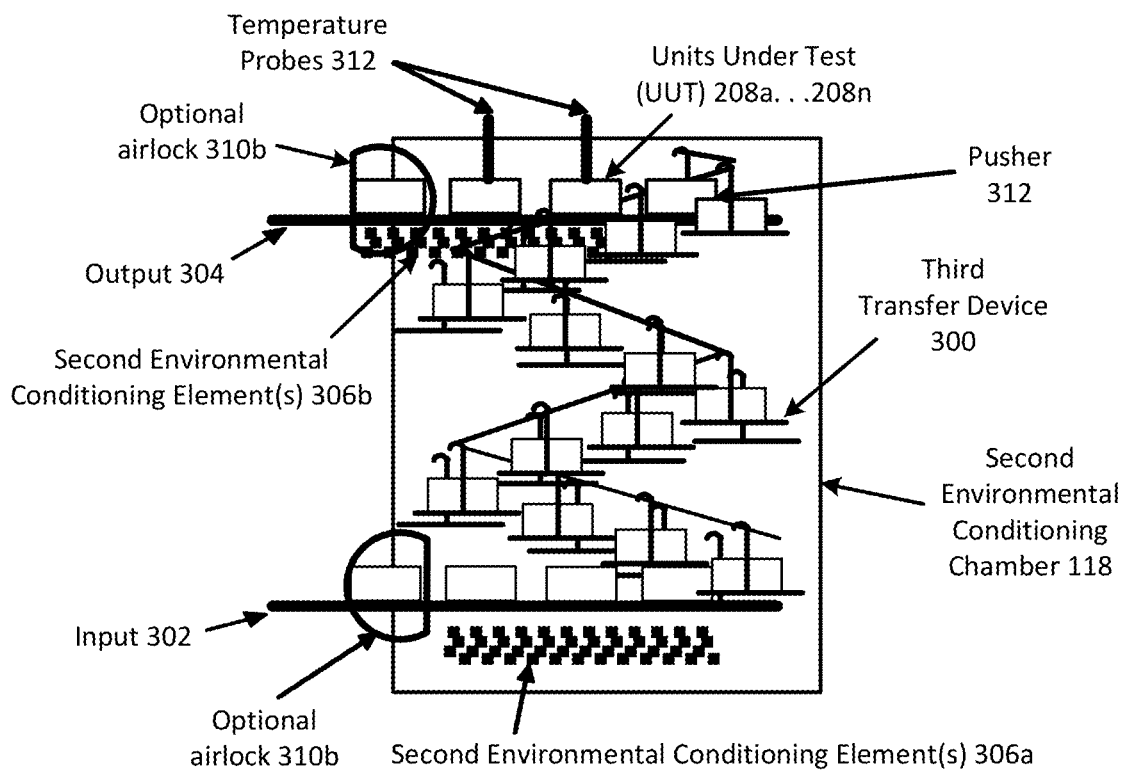
FIGS. 3C and 3D are schematic diagrams illustrating other example embodiments of a transfer device of a second environmental conditioning chamber according to some embodiments of the present disclosure.
Figure 3D:
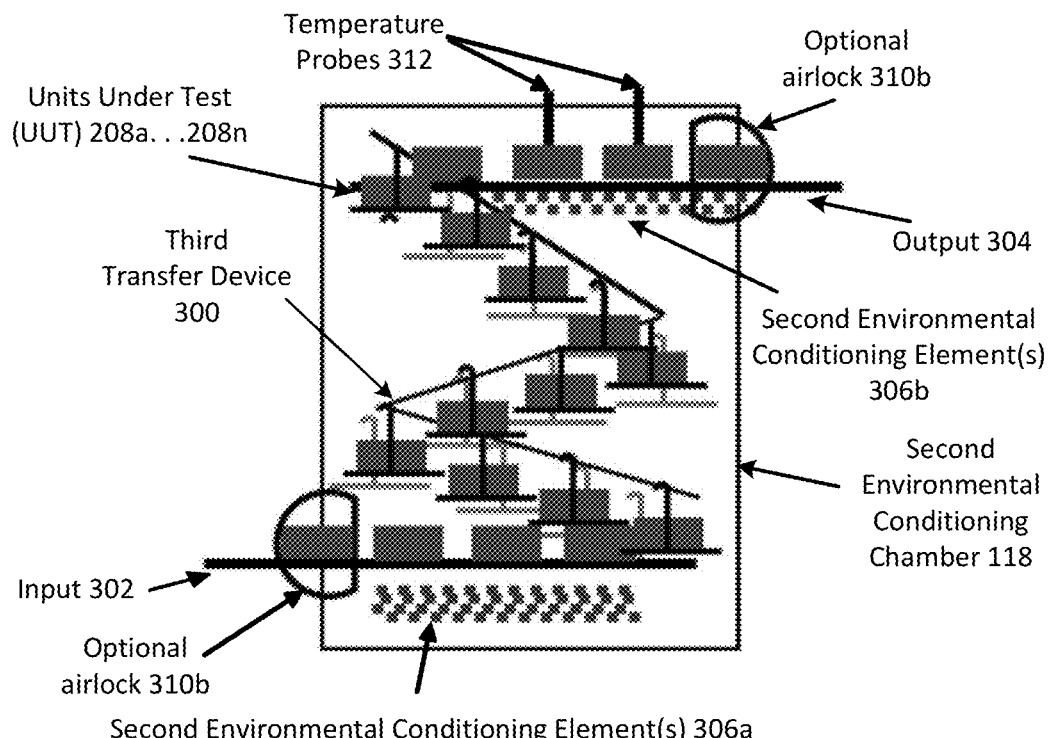

FIGS. 3C and 3D are schematic diagrams illustrating other example embodiments of the third transfer device 300 of second environmental conditioning chamber 118. Features that are similar to features described above in FIGS. 3A and 3B will not be repeated. In the examples of FIGS. 3C, 3D, third transfer device 300 inside the second environmental conditioning chamber 118 is a conveyor that includes an initial conveyor belt length that is proximate input 302, transitions to a conveyor chain drive having "chairlift" style platforms, and then transitions to another length of conveyor belt that is proximate to the output 304. Near the top tier of third transfer device 300, a pusher 312 can be included that is configured to move UUTs 208a . . . 208n off their respective platforms and onto the final length of the conveyor. As depicted in FIGS. 3C and 3D, third transfer device 300 has multiple tiers and is configured to move UUTs 208a . . . 208n between tiers during the cooling, for example. In the example of FIG. 1, once the UUTs are cooled to about a desired temperature, the UUT(s) are moved on a transfer mechanism (e.g., a conveyor) from output 304 of the second environmental conditioning chamber 118 to fourth test station 120.

FIGS. 4A-4C illustrate three example embodiments, respectively, of a conveyor configuration of second transfer device 200 and/or third transfer device 300. In FIG. 4A, UUTs 208a . . . 208n are illustrated on a conveyor having a back-and forth conveyor configuration (e.g., a spiral configuration). FIG. 4B illustrates one example of UUTs 208a . . . UUT 208n on a conveyor spiral configured around a central axis. FIG. 4C illustrates another example of UUTs 208a . . . UUT 208n on a conveyor spiral configured around a central axis. Regardless of the number of the multiple tiers of the conveyor configurations of FIGS. 4A-4C, respectively, these conveyor configurations can be configured to occupy about as much floor area as a single layer of existing linearly configured tester systems. Consequently, total capacity of UUTs processed is increased in accordance with various embodiments of the present disclosure.

FIGS. 5A-5C illustrate another example embodiment of the second transfer device 200 of first environmental conditioning chamber 114. FIG. 5A is a side view of second transfer device 200 that includes shelves at multiple tiers holding UUTs 208a . . . 208n inside first environmental conditioning chamber 114. FIG. 5B is an end view of second transfer device 200 that includes (1) the shelves at multiple tiers configured to hold UUTs 208a . . . 208n and (2) an end effector 500. FIG. 5C is a top view of second transfer device 200 that includes (1) the top shelf of the multiple tiers of shelves holding UUTs 208a . . . 208n and (2) the end effector 500. End effector 500 can be attached to a robot and configured to grab a UUT 208 from the end of a shelf (e.g., as illustrated by the Y-Z gantry with end effector 500 in FIG. 5B). The end effector 500 can be any appropriate end effector including, without limitation, a gripper, a suction, etc.). In some embodiments, a multi-axis robotic arm with an end-effector is used (e.g., which can include 3 or more axes (e.g., including rotational axes) as opposed to the Y-Z gantry with end effector 500 illustrated in FIG. 5B). As best illustrated by FIG. 5C, regardless of the number of the multiple tiers of the second transfer device 200 of FIGS. 5A-5C, respectively, such a second transfer device configuration can be configured to occupy about as much floor area as a single layer of existing linearly configured tester systems plus the area occupied by the gantry/robot. Consequently, total capacity of UUTs processed is increased in accordance with various embodiments of the present disclosure.

In some embodiments, the second transfer device includes at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the first environmental conditioning chamber.

FIGS. 6A-6C illustrate another example embodiment of third transfer device 300 of second environmental conditioning chamber 118. FIG. 6A is a side view of third transfer device 300 that includes shelves at multiple tiers holding UUTs 208a . . . 208n inside second environmental conditioning chamber 118. FIG. 6B is an end view of third transfer device 300 that includes (1) the shelves at multiple tiers configured to hold UUTs 208a . . . 208n and (2) an end effector 600. FIG. 6C is a top view of third transfer device 300 that includes (1) the top shelf of the multiple tiers of shelves holding UUTs 208a . . . 208n and (2) the end effector 600. End effector 600 can be attached to a robot and configured to grab a UUT 208 from the end of a shelf (e.g., as illustrated by the Y-Z gantry with end effector 600 in FIG. 6B). The end effector 600 can be any appropriate end effector including, without limitation, a gripper, a suction, etc.). In some embodiments, a multi-axis robotic arm with an end-effector is used (e.g., which can include 3 or more axes (e.g., including rotational axes) as opposed to the Y-Z gantry with end effector 600 illustrated in FIG. 6B). As best illustrated by FIG. 6C, regardless of the number of the multiple tiers of the third transfer device 300 of FIGS. 6A-6C, respectively, such a third transfer device configuration can be configured to occupy about as much floor area as a single layer of existing linearly configured tester systems plus the area occupied by the gantry/robot. Consequently, total capacity of UUTs processed is increased in accordance with various embodiments of the present disclosure.

In some embodiments, the third transfer device includes at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the second environmental conditioning chamber in the first transport level.

Figure 7:
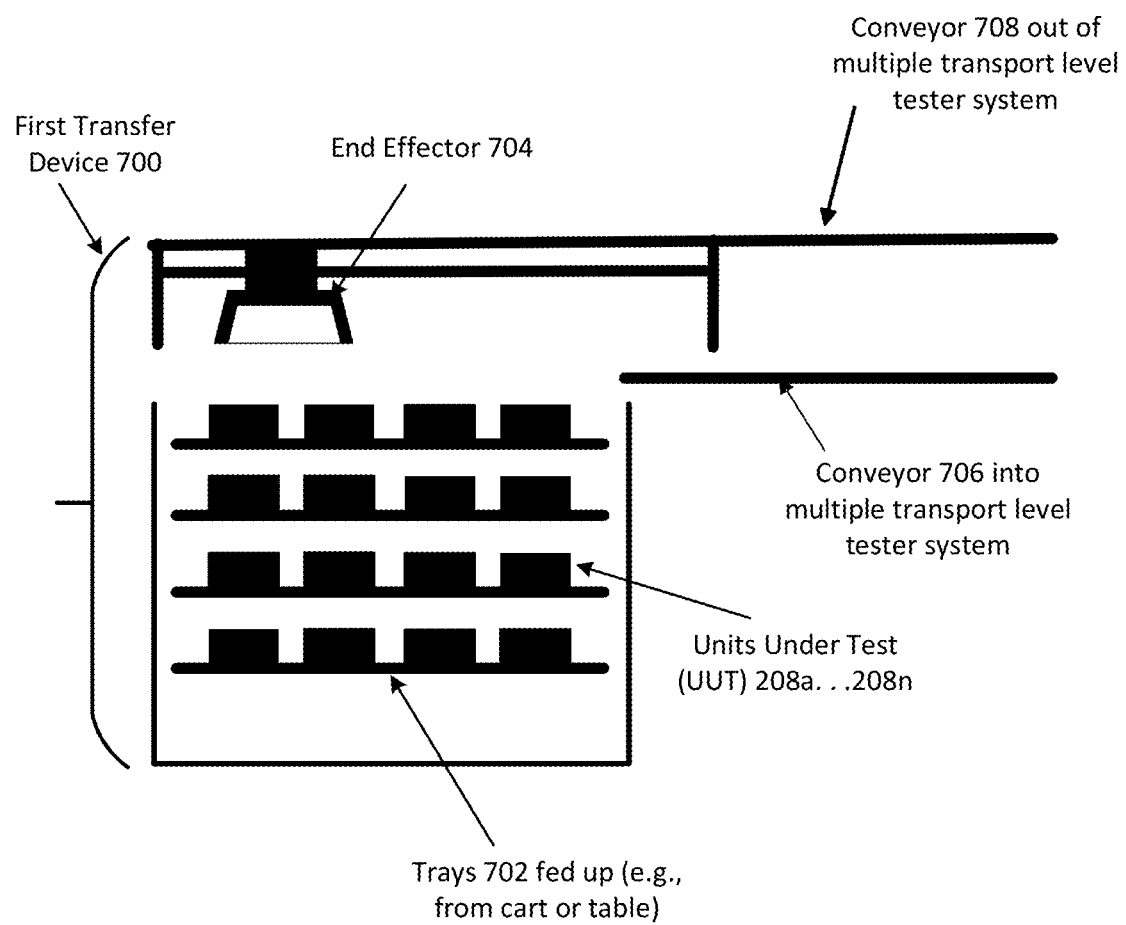
FIG. 7 illustrates an example embodiment of a transfer device of an entry point and/or an exit point according to some embodiments of the present disclosure.

FIG. 7 illustrates an example embodiment of a first transfer device of entry point 106 and/or exit point 108a. UUTs may be moved between multiple tiers inside entry point 106 and/or exit point 108a on trays holding the UUTs that are fed upwards from one tier to another tier, and a robotic end effector can pick and place respective UUTs. For example, FIG. 7 illustrates a side view of the first transfer device 700. The first transfer device 700 includes: (1) a conveyor 706 into entry point 106 or exit point 108a; (2) shelves/trays 702 at multiple tiers holding UUTs 208a . . . 208n inside entry point 106 and/or exit point 108a; (3) robotic end effector 704 that can be used to place UUTs 208a . . . 208n into and/or out of packaging; and (4) a conveyor 708 out of entry point 106 or exit point 108a. End effector 704 can be attached to a robot and configured to grab a UUT 208 from a shelf/tray on the top level of the multi-level shelf/try positions. The end effector 704 can be any appropriate end effector including, without limitation, a gripper, a suction, etc.). In some embodiments, a multi-axis robotic arm with an end-effector is used (e.g., which can include any of 3 or more axes movement). As illustrated by FIG. 7, regardless of the number of the multiple tiers of the third transfer device 700, such a third transfer device configuration can be configured to occupy about as much floor area as a single layer of existing linearly configured tester systems plus the area occupied by the gantry/robot. Consequently, total capacity of UUTs processed is increased in accordance with various embodiments of the present disclosure.

In some embodiments, an input to the entry point can be fed by a conveyor from a previous production step, without an end effector or trays.

In some embodiments, the first transfer device is a multi-axis robot and/or inspection system (e.g., to identify the UUT) during transport of a UUT(s) on its way to a test station.

While not illustrated in FIG. 7, the entry point can include a conveyor, gantry, and/or a multi-axis robot that transfers UUT(s) (e.g., under view of an optional camera system to the first test station 112).

In some embodiments, the first transfer device includes a shelf system having the one or more tiers for at least one shelf and an end-effector configured to move a UUT from the at least one shelf towards the first test station.

In some embodiments, the fourth transfer device includes a shelf system having the one or more tiers for at least one shelf and an end-effector configured to move a UUT from the at least one shelf towards the output of the exit point.

FIGS. 8-12 are block diagrams of other example embodiments of multiple transport level tester system 100 having components thereof positioned in alternate locations within the multiple transport level tester system in comparison to the example of FIG. 1. Therefore, for ease of discussion, features of components discussed above for FIG. 1 that are similar and have the same reference numerals and/or flow of a UUT(s) through the multiple transport level tester system will not be repeated here with respect to FIGS. 8-12.

Figure 8:
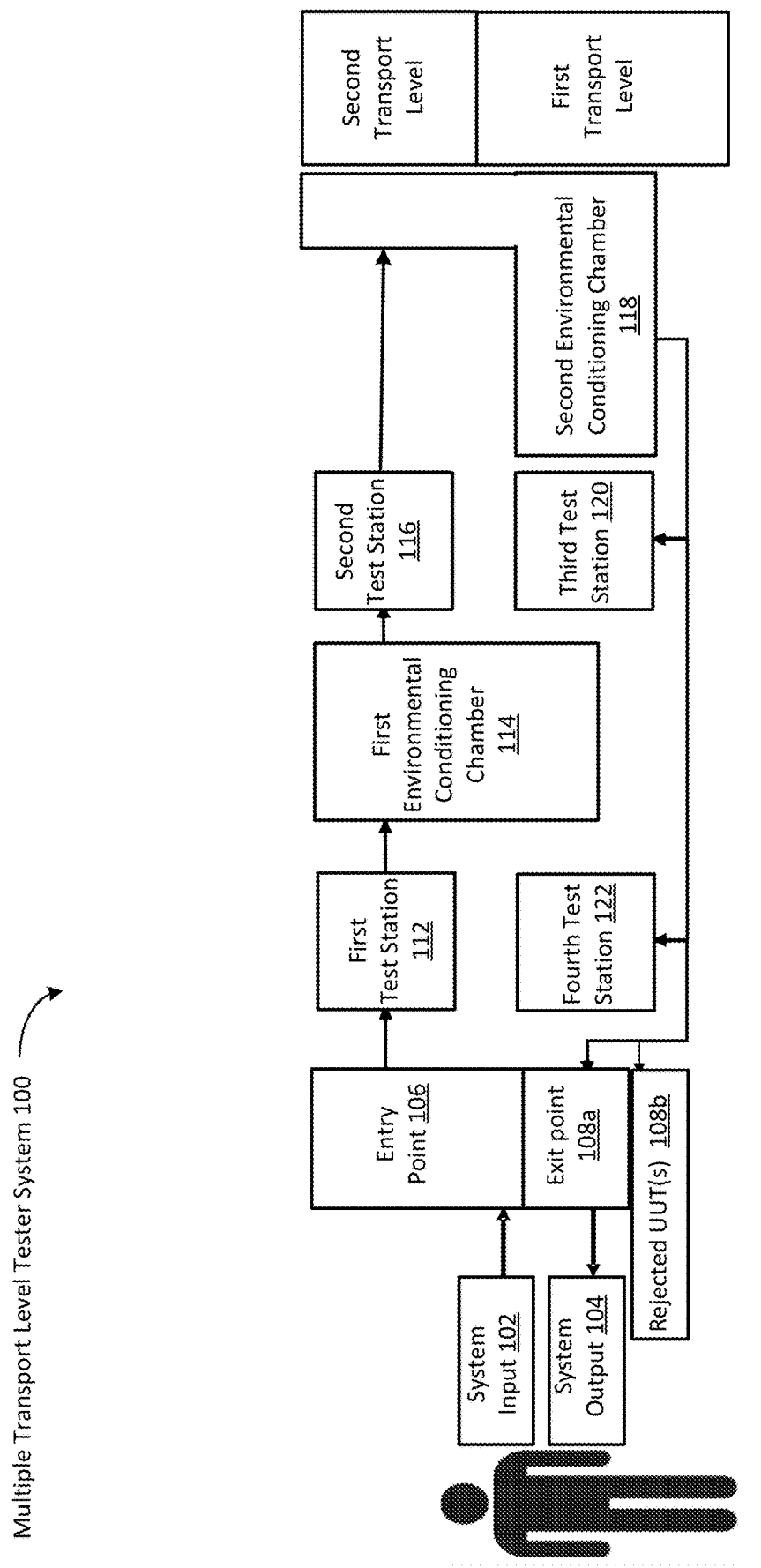
FIGS. 8-12 are block diagrams of other example embodiments of a multiple transport level tester system according to some embodiments of the present disclosure.

Referring now to FIG. 8, FIG. 8 shows another example illustration of multiple transport level tester system 100 including at least two transport levels: a first transport level and a second transport level.

In the example embodiment of FIG. 8, multiple transport level tester system 100 includes components configured in the first transport level and in the second transport level, as illustrated. In the example embodiment of FIG. 8, the first transport level includes: an input to system input 102 and an input to entry point 106; an input and output for fourth test station 122; an input and output for third test station 120; an output from second environmental conditioning unit 118; an input and output for exit point 108a; an input to system output 104; and an input to rejected UUT(s) 108b. The second transport level includes: an output of entry point 106; and input and output of first test station 112; an input to first environmental conditioning chamber 114; an input and output for second test station 116; and an input to second environmental conditioning chamber 118.

As shown in the example of FIG. 8, in the y-direction of FIG. 8, the first transport level extends from about a level of a floor to a level corresponding to about the height of the illustrated person; and the second transport level extends from a level at about a height of the illustrated person to a level corresponding to a height of a tallest component in the second transport level.

In the example of FIG. 8, a flow of UUT(s) 208a . . . 208n through the multiple transport level tester system 100 is as follows. UUT(s) 208a . . . 208n is input to system input 102 via a transfer mechanism, such as a conveyor. The system input 102 is connected to entry point 106, which may also include components for identifying the UUT. As discussed herein, entry point 106 can include multiple tiers for UUTs inside the entry point 106. In this example, the UUTs 208a . . . 208n are output from entry point 106 onto another transfer mechanism (e.g., a conveyor), and the transfer mechanism inputs the UUTs 208a . . . 208n to first test station 112.

Upon completion of testing in first test station 112, a transfer mechanism (e.g., a conveyor) moves the UUTs 208a . . . 208n to first environmental conditioning chamber 114 (including second transfer device 200 therein).

Once the UUTs are heated, for example, to about a desired, elevated temperature, the UUT(s) 208a . . . 208n are moved on a transfer mechanism (e.g., a conveyor) from the first environmental conditioning chamber to second test station 116.

Upon completion of the testing in second test station 116, a transfer mechanism (e.g., a conveyor) moves the UUTs 208a . . . 208n to second environmental conditioning chamber 118 (including third transfer device 300 therein).

Once the UUTs are cooled, for example, to about a desired temperature, the UUT(s) 208a . . . 208n are moved on a transfer mechanism (e.g., a conveyor) from the second environmental conditioning chamber 118 to third test station 120.

Upon completion of the testing in third test station 120, a transfer mechanism (e.g., a conveyor) moves the UUT(s) 208a . . . 208n to fourth test station 122.

Upon completion of the testing in fourth test station 122, a transfer mechanism (e.g., a conveyor) moves the UUT(s) 208a . . . 208(n) that satisfied the various tests to exit point 108a, and moves the UUT(s) 208a . . . 208n that failed to satisfy one or more of the various tests to rejected UUTs component 108b.

As discussed further herein, exit point 108a can include multiple tiers for UUTs inside the exit point 108a. In FIG. 8, the UUT(s) 208a . . . 208n are output from exit point 108a onto another transfer mechanism (e.g., a conveyor), and the transfer mechanism provides the UUT(s) 208a . . . 208n to system output 104.

Figure 9:
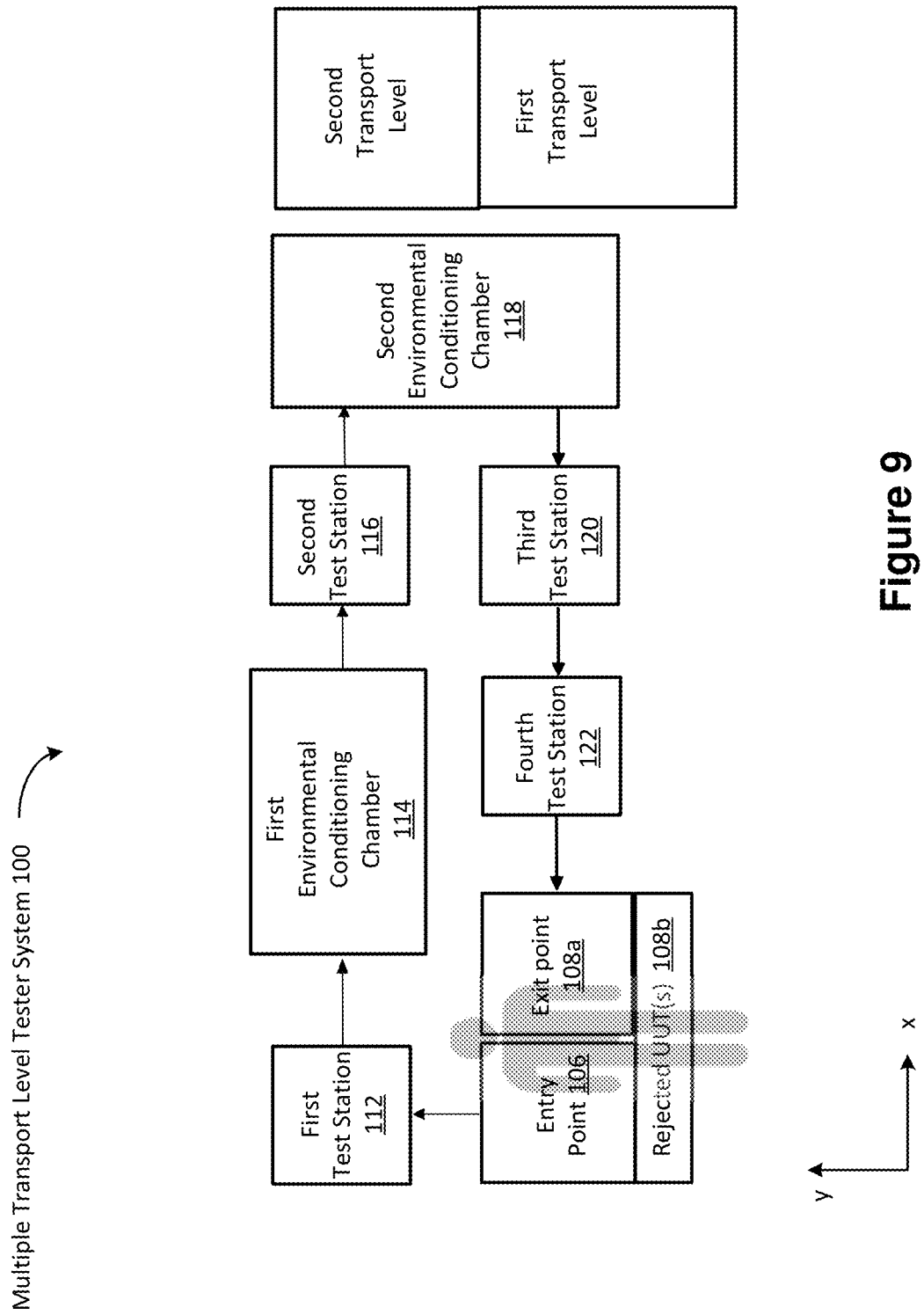

In the example of FIG. 9, multiple transport level tester system 100 includes components configured in a first transport level and in a second transport level, as illustrated. In the example embodiment of FIG. 9, the first transport level includes: an input to entry point 106; an input and output for fourth test station 122; an input and output for third test station 120; an output from second environmental conditioning unit 118; an input and output for exit point 108a; and an input to rejected UUT(s) 108b. The second transport level includes: an output of entry point 106; and input and output of first test station 112; an input and output for first environmental conditioning chamber 114; an input and output for second test station 116; and an input to second environmental conditioning chamber 118.

As shown in the example of FIG. 9, in the y-direction of FIG. 9, the first transport level extends from about a level of a floor to a level corresponding to about the height of the illustrated person; and the second transport level extends from a level at about a height of the illustrated person to a level corresponding to a height of a tallest component in the second transport level.

In the example of FIG. 8, a flow of UUT(s) 208a . . . 208n through the multiple transport level tester system 100 is as follows. UUT(s) 208a . . . 208n is input to entry point 106, which may also include components for identifying the UUT. As discussed herein, entry point 106 can include multiple tiers for UUTs inside the entry point 106. In this example, the UUTs 208a . . . 208n are output from entry point 106 onto another transfer mechanism (e.g., a conveyor), and the transfer mechanism inputs the UUTs 208a . . . 208n to first test station 112.

Upon completion of testing in first test station 112, a transfer mechanism (e.g., a conveyor) moves the UUTs 208a . . . 208n to first environmental conditioning chamber 114 (including second transfer device 200 therein).

Once the UUTs are heated, for example, to about a desired, elevated temperature, the UUT(s) 208a . . . 208n are moved on a transfer mechanism (e.g., a conveyor) from the first environmental conditioning chamber to second test station 116.

Upon completion of the testing in second test station 116, a transfer mechanism (e.g., a conveyor) moves the UUTs 208a . . . 208n to second environmental conditioning chamber 118 (including third transfer device 300 therein).

Once the UUTs are cooled, for example, to about a desired temperature, the UUT(s) 208a . . . 208n are moved on a transfer mechanism (e.g., a conveyor) from the second environmental conditioning chamber 118 to third test station 120.

Upon completion of the testing in third test station 120, a transfer mechanism (e.g., a conveyor) moves the UUT(s) 208a . . . 208n to fourth test station 122.

Upon completion of the testing in fourth test station 122, a transfer mechanism (e.g., a conveyor) moves the UUT(s) 208a . . . 208(n) that satisfied the various tests to exit point 108a, and moves the UUT(s) 208a . . . 208n that failed to satisfy one or more of the various tests to rejected UUTs component 108b.

As discussed further herein, exit point 108a can include multiple tiers for UUTs inside the exit point 108a. In FIG. 9, the UUT(s) 208a . . . 208n can be output from exit point 108a onto another transfer mechanism (e.g., a conveyor) out of the system.

Figure 10:
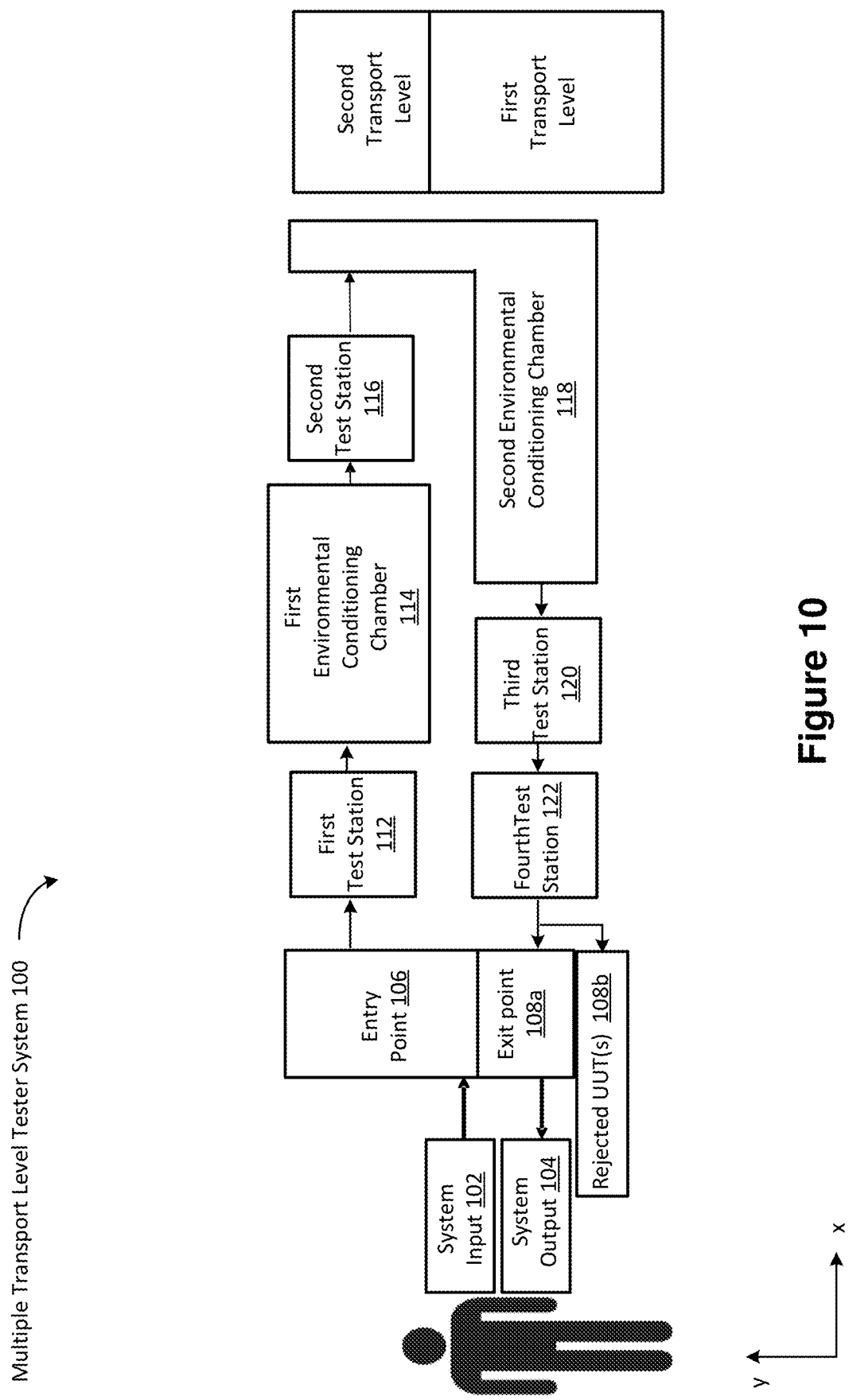

Referring now to FIG. 10, FIG. 10 shows another example illustration of multiple transport level tester system 100 including at least two transport levels: a first transport level and a second transport level.

In the example embodiment of FIG. 10, multiple transport level tester system 100 includes components configured in the first transport level and in the second transport level, as illustrated. In the example embodiment of FIG. 10, the first transport level includes: an input to system input 102 and an input to entry point 106; an input and output for fourth test station 122; an input and output for third test station 120; an output from second environmental conditioning unit 118; an input and output for exit point 108a; an input to system output 104; and an input to rejected UUT(s) 108b. The second transport level includes: an output of entry point 106; and input and output of first test station 112; an input and output for first environmental conditioning chamber 114; an input and output for second test station 116; and an input to second environmental conditioning chamber 118.

As shown in the example of FIG. 10, in the y-direction of FIG. 8, the first transport level extends from about a level of a floor to a level corresponding to about the height of the illustrated person; and the second transport level extends from a level at about a height of the illustrated person to a level corresponding to a height of a tallest component in the second transport level.

In the example of FIG. 10, a flow of UUT(s) 208a . . . 208n through the multiple transport level tester system 100 is as follows. UUT(s) 208a . . . 208n is input to system input 102 via a transfer mechanism, such as a conveyor. The system input 102 is connected to entry point 106, which may also include components for identifying the UUT. As discussed herein, entry point 106 can include multiple tiers for UUTs inside the entry point 106. In this example, the UUTs 208a . . . 208n are output from entry point 106 onto another transfer mechanism (e.g., a conveyor), and the transfer mechanism inputs the UUTs 208a . . . 208n to first test station 112.

Upon completion of testing in first test station 112, a transfer mechanism (e.g., a conveyor) moves the UUTs 208a . . . 208n to first environmental conditioning chamber 114 (including second transfer device 200 therein).

Once the UUTs are heated, for example, to about a desired, elevated temperature, the UUT(s) 208a . . . 208n are moved on a transfer mechanism (e.g., a conveyor) from the first environmental conditioning chamber to second test station 116.

Upon completion of the testing in second test station 116, a transfer mechanism (e.g., a conveyor) moves the UUTs 208a . . . 208n to second environmental conditioning chamber 118 (including third transfer device 300 therein).

Once the UUTs are cooled, for example, to about a desired temperature, the UUT(s) 208a . . . 208n are moved on a transfer mechanism (e.g., a conveyor) from the second environmental conditioning chamber 118 to third test station 120.

Upon completion of the testing in third test station 120, a transfer mechanism (e.g., a conveyor) moves the UUT(s) 208a . . . 208n to fourth test station 122.

Upon completion of the testing in fourth test station 122, a transfer mechanism (e.g., a conveyor) moves the UUT(s) 208a . . . 208(n) that satisfied the various tests to exit point 108a, and moves the UUT(s) 208a . . . 208n that failed to satisfy one or more of the various tests to rejected UUTs component 108b.

As discussed further herein, exit point 108a can include multiple tiers for UUTs inside the exit point 108a. In FIG. 10, the UUT(s) 208a . . . 208n are output from exit point 108a onto another transfer mechanism (e.g., a conveyor), and the transfer mechanism provides the UUT(s) 208a . . . 208n to system output 104.

Figure 11:
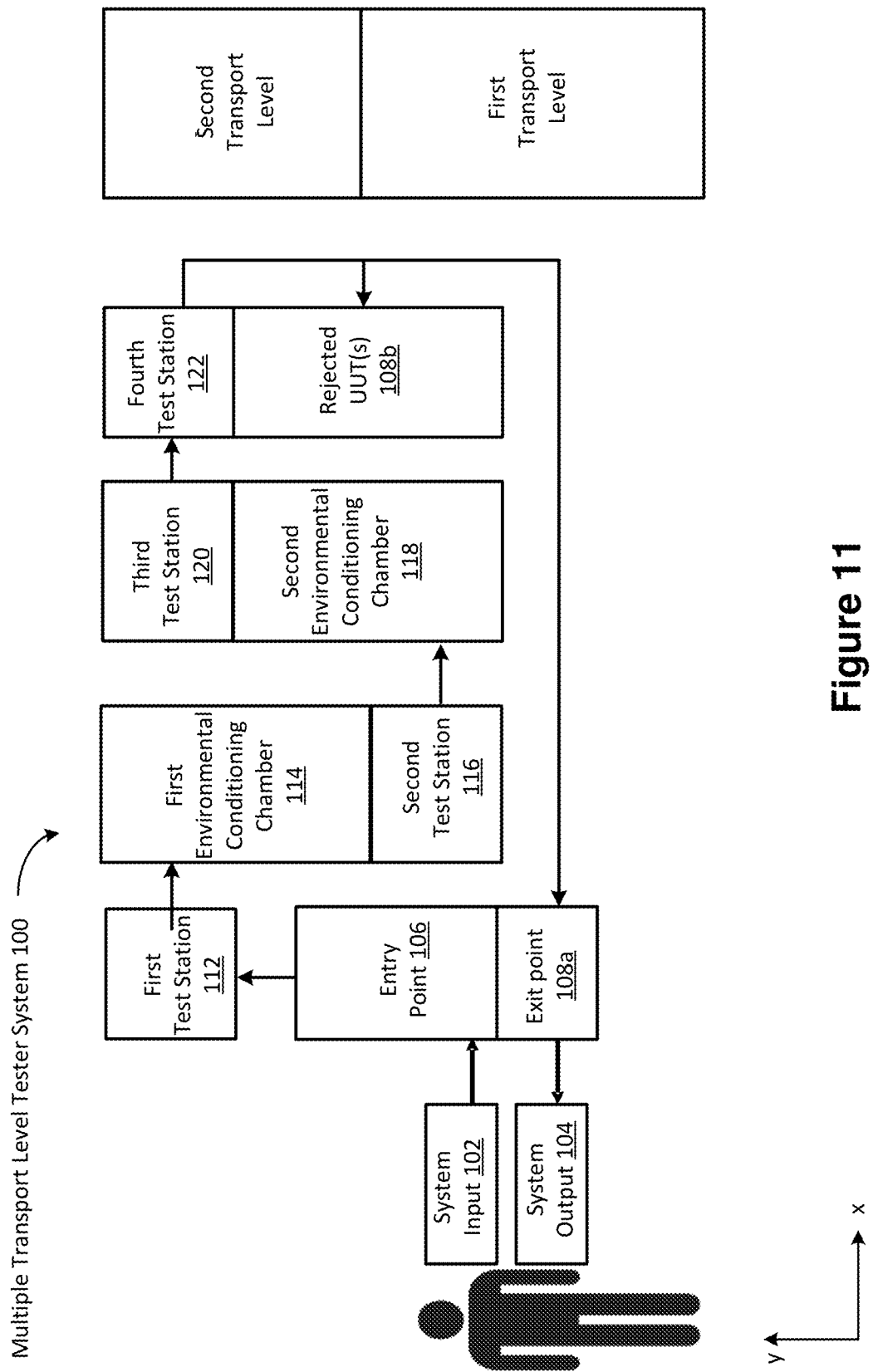

Referring now to FIG. 11, FIG. 11 shows an example illustration of multiple transport level tester system 100 including two transport levels: first transport level and second transport level.

In the example embodiment of FIG. 11, multiple transport level tester system 100 includes components configured in the first transport level and in the second transport level, as illustrated. In the example embodiment of FIG. 11, the first transport level includes: an input to system input 102 and an input to entry point 106; an output of the first environmental conditioning chamber 114; an input to second test station 116; an output of second test station 116; an input to the second environmental conditioning chamber 118; an input and output of exit point 108a; and an output of system output 104. The second transport level includes: an output of entry point 106; and input and output of first tests station 112; an input to first environmental conditioning chamber 114; an output from third test station 120; an input and output of fourth test station 122; and an input to rejected UUT(s) 108b.

As shown in the example of FIG. 11, in the y-direction of FIG. 11, the first transport level extends from about a level of a floor to a level corresponding to about the height of the illustrated person; and the second transport level extends from a level at about a height of the illustrated person to a level corresponding to a height of a tallest component in the second transport level.

In the example of FIG. 11, a flow of UUT(s) 208a . . . 208n through the multiple transport level tester system 100 is as follows. UUT(s) 208a . . . 208n is input to system input 102 via a transfer mechanism, such as a conveyor. The system input 102 is connected to entry point 106, which may also include components for identifying the UUT. As discussed herein, entry point 106 can include multiple tiers for UUTs inside the entry point 106. In this example, the UUTs 208a . . . 208n are output from entry point 106 onto another transfer mechanism (e.g., a conveyor), and the transfer mechanism inputs the UUTs 208a . . . 208n to first test station 112.

Upon completion of testing in first test station 112, a transfer mechanism (e.g., a conveyor) moves the UUTs 208a . . . 208n to first environmental conditioning chamber 114 (including second transfer device 200 therein).

Once the UUTs are heated, for example, to about a desired, elevated temperature, the UUT(s) 208a . . . 208n are moved on a transfer mechanism (e.g., a conveyor) from the first environmental conditioning chamber to second test station 116.

Upon completion of the testing in second test station 116, a transfer mechanism (e.g., a conveyor) moves the UUTs 208a . . . 208n to second environmental conditioning chamber 118 (including third transfer device 300 therein).

Once the UUTs are cooled, for example, to about a desired temperature, the UUT(s) 208a . . . 208n are moved on a transfer mechanism (e.g., a conveyor) from the second environmental conditioning chamber 118 to third test station 120.

Upon completion of the testing in third test station 120, a transfer mechanism (e.g., a conveyor) moves the UUT(s) 208a . . . 208n to fourth test station 122.

Upon completion of the testing in fourth test station 122, a transfer mechanism (e.g., a conveyor) moves the UUT(s) 208a . . . 208(n) that satisfied the various tests to exit point 108a, and moves the UUT(s) 208a . . . 208n that failed to satisfy one or more of the various tests to rejected UUTs component 110 positioned.

As discussed further herein, exit point 108a can include multiple tiers for UUTs inside the exit point 108a. In FIG. 11, the UUT(s) 208a . . . 208n are output from exit point 108a onto another transfer mechanism (e.g., a conveyor), and the transfer mechanism provides the UUT(s) 208a . . . 208n to system output 104.

Thus, in an example embodiment, the first environmental conditioning chamber is configured to receive the UUT in the second transport level and to output the UUT in the first transport level.

In some embodiments, the first environmental conditioning chamber is configured to receive the UUT in the second transport level and the second transfer device is configured to output the UUT in the first transport level.

In some embodiments, the second environmental conditioning chamber is configured to receive the UUT in the first transport level and to output the UUTs in the second transport level.

In some embodiments, the second environmental conditioning chamber is configured to receive the UUT in the first transport level and the third transfer device is configured to output the UUT in the second transport level.

In some embodiments, the third transfer device includes at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the second environmental conditioning chamber in the second transport level.

In some embodiments, a second test station is included and configured to receive and to output the UUT in the first transport level. In some embodiments, a third test station is included and configured to receive and to output the UUT in the second transport level.

In some embodiments, the multiple transport level tester system further includes a fourth test station configured to receive and to output the UUT in the second transport level.

Figure 12:
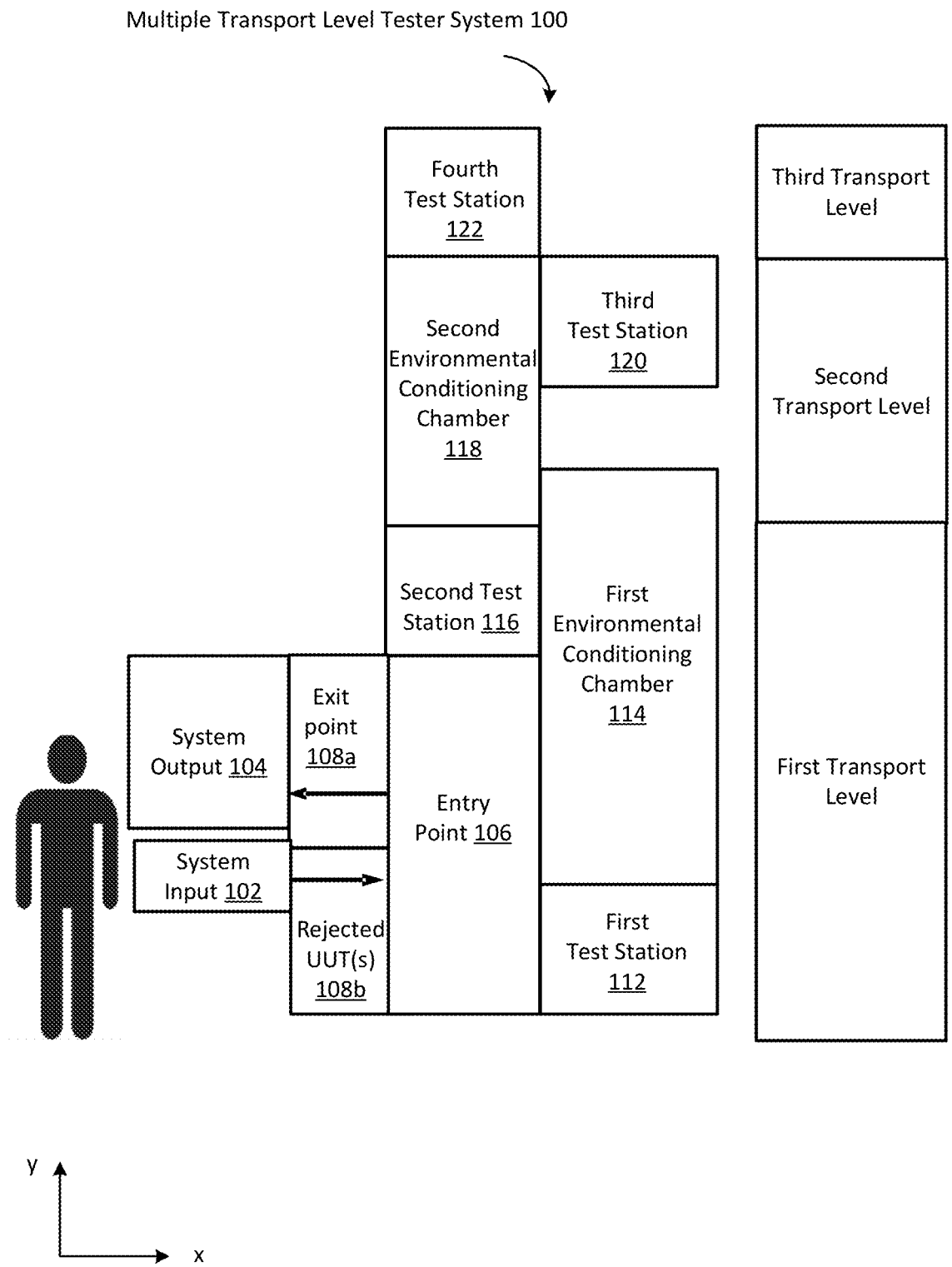

Referring now to FIG. 12, FIG. 12 shows an example illustration of multiple transport level tester system 100 including three transport levels: first transport level, a second transport level. And a third transport level.

In the example embodiment of FIG. 12, multiple transport level tester system 100 includes components configured in the first transport level, the second transport level, and the third transport level as illustrated. In the example embodiment of FIG. 12, the first transport level includes: an input to system input 102; and input and output from entry point 106; an input and output from first test station 112; and an input and output for first environmental conditioning chamber 114; an input to second test station 116; an input to system output 104; and an input to and an input to rejected UUT(s) 108b. The second transport level includes an output of the second test station 116; an input to the second environmental conditioning chamber 118; and an input and output to third test station 120. The third transport level includes an output of the second environmental conditioning chamber 118; and an input and output for fourth test station 122.

As shown in the example of FIG. 12, in the y-direction of FIG. 12, the first transport level extends from about a level of a floor to a level corresponding to about the height of the top of second test station 116, which is above the height of the illustrated person; and the second transport level extends from a level at about a height of the top of second test station 116 to a height at about the top of second environmental conditioning chamber 118 and the top of third test station 120. The third transport level extends from about a level of the top of second environmental conditioning chamber 118 and the top of third test station 120 to a level at about the top of fourth test station 122.

In the example of FIG. 12, a flow of UUT(s) 208a ... 208n through the multiple transport level tester system 100 is as follows. UUT(s) 208a ... 208n is input to system input 102 via a transfer mechanism, such as a conveyor. The system input 102 is connected to entry point 106, which may also include components for identifying the UUT. As discussed herein, entry point 106 can include multiple tiers for UUTs inside the entry point 106. In some embodiments, the entry point is configured to receive the UUT in the first transport level and the first transfer device is configured to move the UUT between the one or more tiers within the first transport level. In this example, the UUTs 208a ... 208n are output from entry point 106 onto another transfer mechanism (e.g., a conveyor), and the transfer mechanism inputs the UUTs 208a ... 208n to first test station 112 ne.

Upon completion of testing in first test station 112, a transfer mechanism (e.g., a conveyor) moves the UUTs 208a ... 208n to first environmental conditioning chamber 114 (including second transfer device 200 therein). Once the UUTs are heated, for example, to about a desired elevated temperature, the UUT(s) 208a ... 208n are moved on a transfer mechanism (e.g., a conveyor) from the first environmental conditioning chamber to second test station 116.

In an example embodiment, the first environmental conditioning chamber is configured to receive the UUT in the first transport level and to output the UUT in the second transport level. In some embodiments, the first environmental conditioning chamber is configured to receive the UUT in the first transport level and the second transfer device is configured to output the UUT in the second transport level.

Upon completion of the testing in second test station 116, a transfer mechanism (e.g., a conveyor) moves the UUTs 208a ... 208n to second environmental conditioning chamber 118 (including third transfer device 300 therein). Once the UUTs are cooled, for example, to about a desired temperature, the UUT(s) 208a ... 208n are moved on a transfer mechanism (e.g., a conveyor) from the second environmental conditioning chamber 118 to third test station 120.

In an example embodiment, the second environmental conditioning chamber is configured to receive the UUT in the second transport level and to output the UUT in the third transport level. In some embodiments, the second environmental conditioning chamber is configured to receive the UUT test and includes a third transfer device having one or more tiers where the third transfer device is configured to move the UUT between the one or more tiers. In some embodiments, the second environmental conditioning chamber is configured to receive the UUT in the second transport level and the third transfer device is configured to output the UUT in the third transport level.

In some embodiments, the third transfer device includes at least one of (i) a belt-driven conveyor; (ii) a chain-driven conveyor; (iii) a cable-driven conveyor; (iv) a 2-or-more axis robot; and (iv) a shelf system having a respective shelf at a tier in the one or more tiers and an end-effector configured to move the UUT towards an output of the second environmental conditioning chamber in the third transport level.

Upon completion of the testing in third test station 120, a transfer mechanism (e.g., a conveyor) moves the UUT(s) 208a ... 208n to fourth test station 122.

In an example embodiment, a third test station is included and configured to receive the UUT in the second transport level and to output the UUT to the third transport level.

Upon completion of the testing in test station 122, a transfer mechanism (e.g., a conveyor) moves the UUT(s) 208a ... 208(n) that satisfied the various tests to exit point 108a positioned in the first transport level, and moves the UUT(s) 208a ... 208n that failed to satisfy one or more of the various tests to rejected UUTs component 110 positioned beneath the first transport level. For example, a transfer mechanism (e.g., a conveyor) can be outside the test station 122 that extends to and through exit point 108a and rejected UUT(s) 108b.

In some embodiments, the multiple transport level tester system includes a linear footprint that is about 30%-70% less than a linear arrangement in one transport level of at least the entry point, the exit point, the first environmental conditioning chamber, the second environmental conditioning chamber, and the first test station. In some embodiments, the linear footprint is 30%-70% less than a linear arrangement in one transport level of at least the entry point, the exit point, the first environmental conditioning chamber, the second environmental conditioning chamber, and the first test station. In yet other embodiments, the linear footprint is 40%-60% less than a linear arrangement in one transport level of at least the entry point, the exit point, the first environmental conditioning chamber, the second environmental conditioning chamber, and the first test station. In some embodiments, the linear footprint is 45%-55% less than a linear arrangement in one transport level of at least the entry point, the exit point, the first environmental conditioning chamber, the second environmental conditioning chamber, and the first test station.

In some embodiments, the UUT includes a semiconductor-based power module.

Some embodiments described herein can reduce the cost, floor space, and/or time needed to test and determine whether UUTs satisfy test requirements by providing a multiple transport level tester system configured to implement test conditions and testing of UUTs.

Although embodiments of the inventive concepts have been described in considerable detail with reference to certain configurations thereof, other versions are possible. The multiple transport level tester system can have many different configurations and different numbers of components. Accordingly, the spirit and scope of the invention should not be limited to the specific embodiments described above.

What is claimed is:

1. A multiple transport level tester system comprising:
an entry point;
an exit point;
a first transport level having a first level;
a second transport level having a second level;
wherein the first level is different than the second level;
a first environmental conditioning chamber configured to perform a first environmental conditioning on a unit under test;
a second environmental conditioning chamber configured to perform a second environmental conditioning on the unit under test; and
a plurality of test stations comprising a first test station configured to perform a first test on the unit under test in the first transport level and a second test station configured to perform a second test on the unit under test in the second transport level.

2. The multiple transport level tester system of claim 1, further comprising:
a first end of the multiple transport level tester system;
a second end of the multiple transport level tester system;
a first side of the multiple transport level tester system; and
a second side of the multiple transport level tester system, wherein the multiple transport level tester is configured between the first end and the second end and between the first side and the second side.

3. The multiple transport level tester system of claim 2, wherein the entry point and the exit point are configured at one or more of the first end, the second end, the first side, and the second side, and at least one of the first end and the second end of the multiple transport level tester system.

4. The multiple transport level tester system of claim 2, wherein the first level and second levels, respectively, are substantially level between the first and second ends of the multiple transport level tester system.

5. The multiple transport level tester system of claim 2, wherein the first level has a vAraible level within the first transport level.

6. The multiple transport level tester system of claim 2, wherein the second level has a vAraible level within the second transport level.

7. The multiple transport level tester system of claim 1, wherein the first environmental conditioning chamber is configured to receive and to output the unit under test in the second transport level.

8. The multiple transport level tester system of claim 1, wherein the first environmental conditioning chamber is configured to receive the unit under test in the second transport level and to output the unit under test in the first transport level.

9. The multiple transport level tester system of claim 1, wherein the first environmental conditioning chamber is configured to receive the unit under test in the first transport level and to output the unit under test in the second transport level.

10. The multiple transport level tester system of claim 1, wherein the first environmental conditioning chamber comprises an environmental controller configured to control at least one of (i) a temperature, (ii) an atmospheric condition, (iii) a humidity, (iv) electromagnetic radiation, and (v) a pressure.

11. The multiple transport level tester system of claim 1, wherein
the second test station is configured to receive and to output the unit under test in the second transport level.

12. The multiple transport level tester system of claim 1, wherein
the second test station is configured to receive and to output the unit under test in the first transport level.

13. The multiple transport level tester system of claim 1, further comprising:
a third test station configured to receive and to output the unit under test in the first transport level.

14. The multiple transport level tester system of claim 1, further comprising:
a third test station configured to receive and to output the unit under test in the second transport level.

15. The multiple transport level tester system of claim 1, further comprising:
a fourth test station configured to receive and to output the unit under test in the first transport level.

16. The multiple transport level tester system of claim 1, further comprising:
a fourth test station configured to receive and to output the unit under test in the second transport level.

17. The multiple transport level tester system of claim 1, further comprising:
a third transport level having a third level; and
a third test station configured to receive the unit under test in the second transport level and to output the unit under test to the third transport level.

18. The multiple transport level tester system of claim 1, wherein the multiple transport level tester system comprises a linear footprint that is about 30%-70% less than a linear arrangement in one transport level of at least the entry point, the exit point, the first environmental conditioning chamber, the second environmental conditioning chamber, and the first test station.

19. The multiple transport level tester system of claim 1, wherein the unit under test comprises a semiconductor-based power module.

20. A multiple transport level tester system, comprising:
an entry point;
at least one exit point;
a reject point;
wherein the at least one exit point has a different location than the reject point;

a first transport level having a first level comprising at least one test station configured to perform at least one test on the plurality of units under test;

at least one additional transport level having at least one additional level comprising at least one additional test station configured to perform at least one additional test on the plurality of units under test, wherein the first level is different than the at least one additional level; and at least one environmental conditioning chamber configured to perform an environmental conditioning on a plurality of units under test.

21. The multiple transport level tester system of claim 20, wherein the entry point is configured to receive the unit under test and comprises a first transfer device configured to handle one or more tiers.

22. The multiple transport level tester system of claim 21, wherein the entry point is configured to receive the unit under test in the at least one additional transport level and the first transfer device is configured to move the unit under test between the one or more tiers within the at least one additional transport level.

23. The multiple transport level tester system of claim 21, wherein the entry point is configured to receive the unit under test in the first transport level and the first transfer device is configured to move the unit under test between the one or more tiers within the first transport level.

24. The multiple transport level tester system of claim 21, wherein the first transfer device comprises a shelf system having the one or more tiers for at least one shelf and an end-effector configured to move a unit under test from the at least one shelf towards the first test station.

25. The multiple transport level tester system of claim 20, wherein the at least one environmental conditioning chamber is configured to receive the unit under test and comprises a second transfer device having one or more tiers, the second transfer device configured to move the unit under test between the one or more tiers.

26. The multiple transport level tester system of claim 25, wherein the at least one environmental conditioning chamber is configured to receive the unit under test in the at least one additional transport level and the second transfer device is configured to output the unit under test in the at least one additional transport level.

27. The multiple transport level tester system of claim 25, wherein the at least one environmental conditioning chamber is configured to receive the unit under test in the at least one additional second transport level and the second transfer device is configured to output the unit under test in the first transport level.

28. The multiple transport level tester system of claim 25, wherein the second transfer device comprises at least one of (i) a belt-driven conveyor; (ii) a chain-driven conveyor; (iii) a cable-driven conveyor; (iv) a 2-or-more axis robot and (v) a shelf system having a respective shelf at a tier in the one or more tiers and an end-effector configured to move the unit under test towards an output of the at least one environmental conditioning chamber.

29. The multiple transport level tester system of claim 20, wherein the at least one exit point is configured to output the unit under test and comprises a fourth transfer device having one or more tiers.

30. The multiple transport level tester system of claim 29, wherein the at least one exit point is configured to receive and to output the unit under test in the first transport level and the fourth transfer device is configured to move the unit under test between the one or more tiers within the first transport level.

31. The multiple transport level tester system of claim 29, wherein the fourth transfer device comprises a shelf system having the one or more tiers for at least one shelf and an end-effector configured to move a unit under test from the at least one shelf towards the output of the exit point.

32. The multiple transport level tester system of claim 20, wherein the multiple transport level tester system comprises a linear footprint that is about 30%-70% less than a linear arrangement in one transport level of at least the entry point, the at least one exit point, the at least one environmental conditioning chamber, and the first test station.

* * * * *